(12) United States Patent
Takaishi

(10) Patent No.: US 7,535,192 B2
(45) Date of Patent: May 19, 2009

(54) HEAD POSITIONING CONTROL METHOD, HEAD POSITIONING CONTROL DEVICE AND DISK APPARATUS

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/485,925

(22) Filed: Jul. 13, 2006

(65) Prior Publication Data

US 2007/0229017 A1   Oct. 4, 2007

(30) Foreign Application Priority Data

Mar. 31, 2006 (JP) ............................. 2006-098959

(51) Int. Cl.
*G05B 11/01* (2006.01)

(52) U.S. Cl. .................. 318/560; 318/400.16; 318/561; 360/77.02; 360/77.04; 360/78.06

(58) Field of Classification Search ............. 360/77.04, 360/77.02, 78.06; 318/560, 561, 400.16
See application file for complete search history.

(56) References Cited

U.S. PATENT DOCUMENTS

| | | | | |
|---|---|---|---|---|
| 3,881,184 A | * | 4/1975 | Koepcke et al. | 369/30.01 |
| 4,775,903 A | * | 10/1988 | Knowles | 360/78.07 |
| 5,155,422 A | * | 10/1992 | Sidman et al. | 318/560 |
| 5,369,345 A | * | 11/1994 | Phan et al. | 318/561 |
| 5,677,809 A | * | 10/1997 | Kadlec | 360/78.09 |
| 6,549,349 B2 | * | 4/2003 | Sri-Jayantha et al. | 360/31 |
| 6,721,247 B2 | * | 4/2004 | Watanabe | 369/44.34 |
| 6,853,512 B2 | * | 2/2005 | Ozawa | 360/77.02 |
| 6,865,051 B2 | * | 3/2005 | Takaishi | 360/77.04 |
| 6,903,896 B2 | * | 6/2005 | Miyata et al. | 360/78.06 |
| 2001/0003497 A1 | * | 6/2001 | Takaishi | 360/77.04 |
| 2001/0030828 A1 | | 10/2001 | Takaishi | |
| 2004/0080860 A1 | * | 4/2004 | Inaji et al. | 360/77.02 |
| 2007/0013337 A1 | * | 1/2007 | Liu et al. | 318/619 |
| 2007/0156396 A1 | * | 7/2007 | Ehrlich | 704/216 |
| 2007/0183076 A1 | * | 8/2007 | Baugh et al. | 360/75 |

FOREIGN PATENT DOCUMENTS

| | | |
|---|---|---|
| JP | 07-050075 | 2/1995 |
| JP | 2000-021104 | 1/2000 |
| JP | 2001-283544 | 10/2001 |
| WO | WO 00/72314 | 11/2000 |

* cited by examiner

*Primary Examiner*—Bentsu Ro
*Assistant Examiner*—Antony M Paul
(74) *Attorney, Agent, or Firm*—Greer, Burns & Crain, Ltd.

(57) ABSTRACT

A positioning control device executes disturbance observer control having a disturbance suppression function, wherein changes of control characteristics are prevented even if the disturbance frequency is suppressed. When a control value of an actuator is computed using estimated gains of the actuator and estimated gains of disturbance according to an estimated position error by disturbance observer control including a model of the actuator and model of the disturbance, the disturbance frequency is estimated according to the estimated position error, and the estimated gains of the actuator and the estimated gains of the disturbance, corresponding to the disturbance frequency, are changed. Therefore appropriate observer control according to the disturbance frequency can be implemented.

23 Claims, 17 Drawing Sheets

FIG. 6
| w | L1 | L2 | L3 | L4 | L5 | a11 | a12 | a21 | a22 |
|---|------|------|------|------|------|------|------|------|------|
| 0 | 0.4193 | 1.1180 | 0.0780 | 0.00 | -3.00 | 1.0000 | 0.0000 | 0.0000 | 1.0000 |
| 1 | 0.4215 | 1.1259 | 0.0770 | 1.06 | -2.90 | 0.9997 | -0.0234 | 0.0234 | 0.9997 |
| 2 | 0.4237 | 1.1334 | 0.0759 | 2.08 | -2.68 | 0.9989 | -0.0469 | 0.0469 | 0.9989 |
| 3 | 0.4258 | 1.1407 | 0.0748 | 3.05 | -2.36 | 0.9975 | -0.0703 | 0.0703 | 0.9975 |
| 4 | 0.4279 | 1.1478 | 0.0738 | 3.96 | -1.93 | 0.9956 | -0.0936 | 0.0936 | 0.9956 |
| ... | | | | | | | | | |
| 47 | 0.4785 | 0.9899 | 0.0439 | -39.42 | -36.72 | 0.4519 | -0.8921 | 0.8921 | 0.4519 |
| 48 | 0.4791 | 0.9408 | 0.0435 | -39.07 | -43.93 | 0.4309 | -0.9024 | 0.9024 | 0.4309 |
| 49 | 0.4797 | 0.8823 | 0.0430 | -38.07 | -51.93 | 0.4096 | -0.9123 | 0.9123 | 0.4096 |
| 50 | 0.4802 | 0.8120 | 0.0426 | -36.26 | -60.82 | 0.3881 | -0.9216 | 0.9216 | 0.3881 |
| ... | | | | | | | | | |
FIG. 7
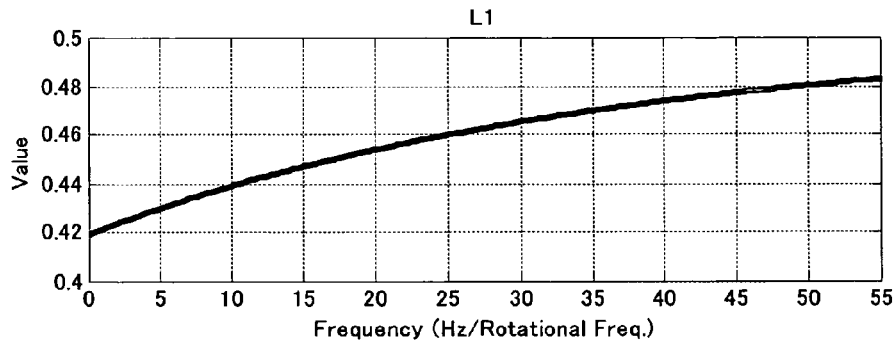
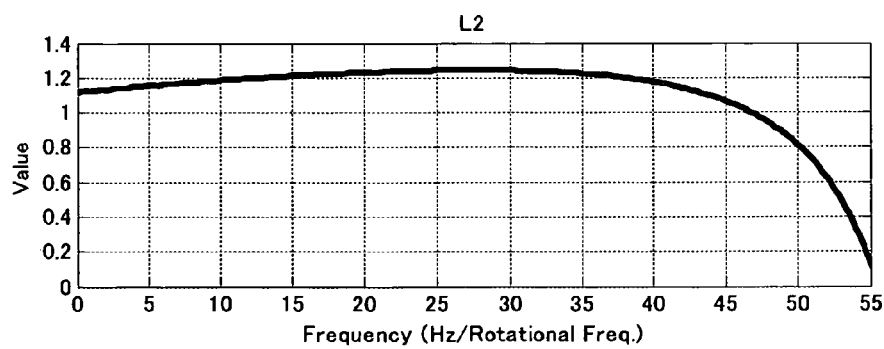

HEAD POSITIONING CONTROL METHOD, HEAD POSITIONING CONTROL DEVICE AND DISK APPARATUS

CROSS-REFERENCE TO RELATED APPLICATIONS

This application is based upon and claims the benefit of priority from the prior Japanese Patent Application No. 2006-098959, filed on Mar. 31, 2006, the entire contents of which are incorporated herein by reference.

BACKGROUND OF THE INVENTION

1. Field of the Invention

The present invention relates to a head positioning control method of a disk apparatus, head positioning control device and disk apparatus, and more particularly to a head positioning control method, head positioning control device and disk apparatus for suppressing position shift caused by external vibration.

2. Description of the Related Art

It is important for a disk device, such as a magnetic disk device or optical disk device, to accurately position the head on the target track in order to improve recording density.

For this positioning control, an eccentricity correction method using an eccentricity estimation observer has been proposed to handle the eccentricity of a disk (e.g. Japanese Patent Application Laid-Open No. H7-50075 and No. 2000-21104).

Such an eccentricity estimation observer calculates a control value of an actuator from an error between an actual position error and estimated position error, using state estimation gains A, B, C, F and L, and calculates the state quality (position, velocity, bias value, eccentricity) of the next sample.

Here the estimated gain L consists of an estimated position gain L1, estimated velocity gain L2, estimated bias gain L3 and estimated eccentricity gains L4 and L5. And L1, L2 and L3 show the characteristics of the controller itself, and L4 and L5 show the response characteristics to eccentricity, which is a periodic disturbance.

By using such an observer, it is desirable to position control so as to follow up to an external vibration, other than an eccentricity component. In other words, as the recording density of a disk device increases, it is becoming difficult to ignore the influence of external vibration on the positioning accuracy of the head. Also as the use of disk devices expends, disk devices are now also installed on mobile equipment, such as portable terminals, portable telephones and portable AV (Audio/Visual) equipment, therefore adapting a wide range of disturbance frequencies is also demanded.

The follow up performance to disturbances can be increased by increasing the estimated gain using prior art, but in this case, the width of the disturbance suppression range must be widened. If the width of the disturbance suppression range is widened, however, the disturbance model and the original model of the controller interfere each other, thereby changing the control characteristics.

SUMMARY OF THE INVENTION

With the foregoing in view, it is an object of the present invention to provide a head positioning control method, a head positioning control device and a disk apparatus for adapting to a wide range of disturbance frequencies without affecting the control characteristics of the observer.

It is another object of the present invention to provide a head positioning control method, a head positioning control device, and a disk apparatus for preventing vibration of the head by adapting to a wide range of disturbance frequencies without affecting the control characteristics of the observer.

It is still another object of the present invention to provide a head positioning control method, a head positioning control device, and a disk apparatus for improving the follow up performance of the head by adapting to a wide range of disturbance frequencies without affecting the control characteristics of the observer.

It is still another object of the present invention to provide a head positioning control method, a head positioning control device and a disk apparatus for improving the read/write characteristics of the head by adapting to a wide range of the disturbance frequencies without affecting the control characteristics of the observer.

The present invention provides a head positioning control method for controlling the positioning of a head in a predetermined position of a disk storage medium by an actuator, having a step of computing an estimated position error from a target position of the head and a current position acquired from the head, a step of generating state information using an estimated gain of the actuator and estimated gain of the disturbance according to an estimated position error between the position error and the estimated position of an observer by disturbance observer control, including a model of the actuator and a model of the disturbance and computing a control value of the actuator from the state information, and a step of estimating disturbance frequency according to the estimated position error and changing the estimated gain of the actuator and the estimated gain of the disturbance according to the disturbance frequency.

Also the present invention provides a disk apparatus having a head for at least reading data on a disk storage medium, an actuator for positioning the head in a predetermined position of the disk storage medium, and a control unit for computing an estimated position error from a target position of the head and a current position acquired from the head, generating state information using an estimated gain of the actuator and estimated gain of disturbance according to an estimated position error between the position error and the estimated position of an observer by disturbance observer control including a model of the actuator and a model of the disturbance, and computing a control value of the actuator from the state information. And the control unit estimates a disturbance frequency according to the estimated position error, and changes the estimated gain of the actuator and estimated gain of the disturbance corresponding to the disturbance frequency.

Also the present invention provides a head positioning control device for positioning a head for at least reading data of a disk storage medium in a predetermined position of the disk storage medium by controlling an actuator, having a processing unit for computing an estimated position error from a target position of the head and a current position acquired from the head, generating state information using an estimated gain of the actuator and estimated gain of disturbance according to the estimated position error between the position error and the estimated position of an observer by disturbance observer control including a model of the actuator and a model of the disturbance, and computing a control value of the actuator from the state information, and a disturbance estimation unit for estimating the disturbance frequency according to the estimated position error and changing the estimated gain of the actuator and the estimated gain of the disturbance corresponding to the disturbance frequency.

In the present invention, it is preferable that the changing step has a step of estimating the disturbance frequency by adaptive control based on the estimated disturbance component according to the estimated position error, and a step of changing the estimated gain of the actuator and the estimated gain of the disturbance corresponding to the estimated disturbance frequency.

Also in the present invention, it is preferable that the estimation step has a step of estimating the disturbance frequency by integrating the estimated disturbance component according to the position error.

Also in the present invention, it is preferable that the computing step has a step of computing an estimated position and estimated velocity from an estimated gain of position and an estimated gain of velocity according to the estimated position error, and a step of computing an estimated disturbance value from the estimated gain of the disturbance according to the estimated position error.

Also in the present invention, it is preferable that the computing step further has a step of generating state information using an estimated gain of an actuator and an estimated gain of disturbance according to an estimated position error between the position error and the estimated position of the observer by disturbance observer control in which a model of the actuator and a model of the disturbance are separated, and computing the control value of the actuator from the state information.

Also in the present invention, it is preferable that the computing step further has a step of generating state information using an estimated gain of the actuator according to an estimated position error between the position error and the estimated position of the observer by observer control of the model of the actuator and computing the control value of the actuator from the state information, a step of generating state information using the estimated gain of the disturbance according to the estimated position error by observer control of the model of the disturbance which is separated from the model of the actuator, and computing a disturbance suppression value from the state information, and a step of computing the control value of the actuator from the control value and the disturbance suppression value.

Also in the present invention, it is preferable that the estimation step further has a step of estimating the disturbance frequency by integrating and double-integrating the estimated disturbance component according to the position error.

Also in the present invention, it is preferable that the step of computing the disturbance suppression value further has a step of generating state information using the estimated gain of the disturbance according to the estimated position error by observer control of a plurality of models of the disturbance of which adaptive disturbance frequencies are different from one another, and computing the disturbance suppression value from the state information.

When a control value of an actuator is computed using an estimated gain of the actuator and estimated gain of disturbance according to an estimated position error by disturbance observer control including a model of the actuator and model of the disturbance, the disturbance frequency is estimated according to the estimated position error, and the estimated gain of the actuator and the estimated gain of the disturbance corresponding to the disturbance frequency are changed, therefore an appropriate observer control according to the disturbance frequency can be implemented.

BRIEF DESCRIPTION OF THE DRAWINGS

FIG. 6 is an estimated gain table in FIG. 5;

FIG. 7 is characteristic diagram depicting the estimated gains L1 and L2 in FIG. 6;

DESCRIPTION OF THE PREFERRED EMBODIMENTS

Embodiments of the present invention will now be described in the sequence of disk apparatus, first embodiment, second embodiment, third embodiment, fourth embodiment of disturbance observer and other embodiments, but the present invention is not limited to these embodiments.

Disk Apparatus

Figure 1:
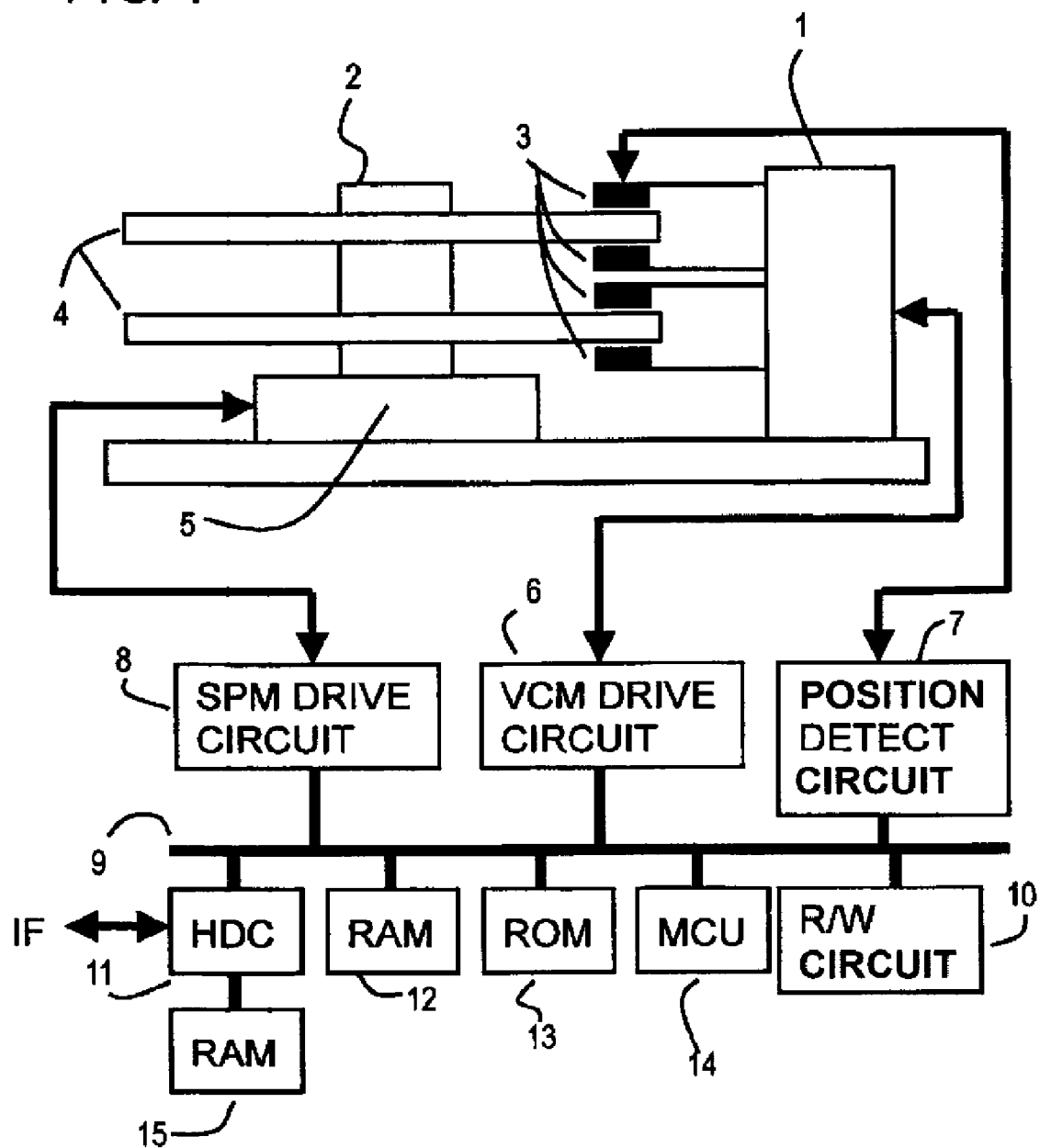
FIG. 1 is a block diagram depicting a disk apparatus according to an embodiment of the present invention.
Figure 2:
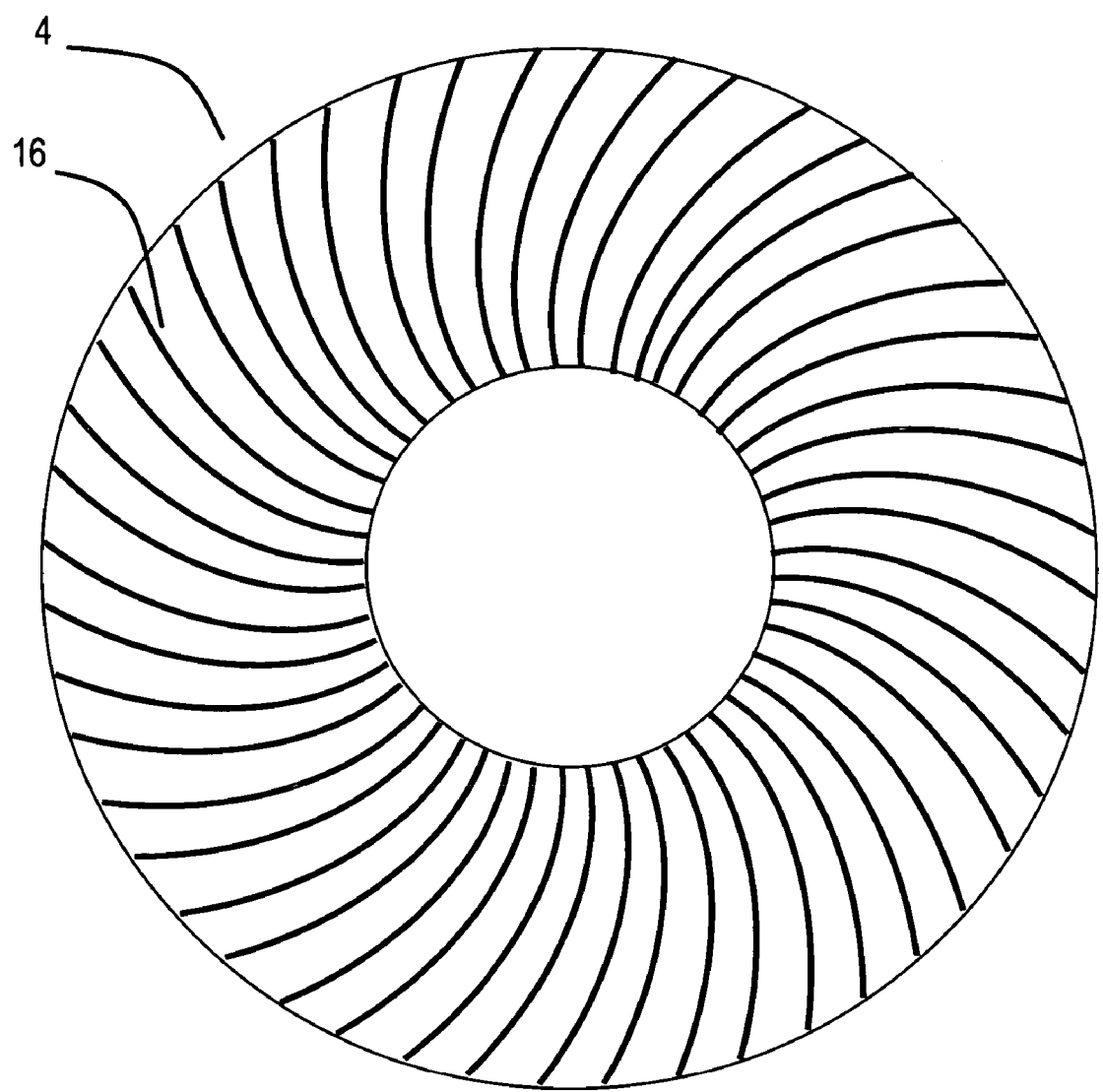
FIG. 2 is a diagram depicting the position signals of the disk in FIG. 1.
Figure 3:
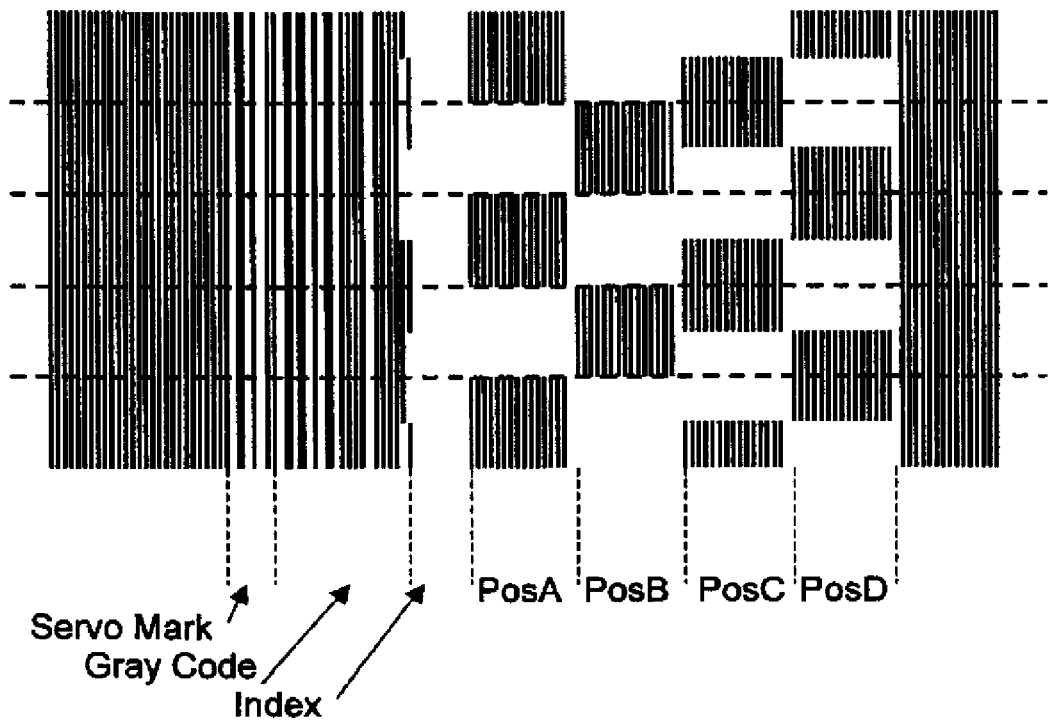
FIG. 3 is a diagram depicting details of the position signals in FIG. 2.
Figure 4:
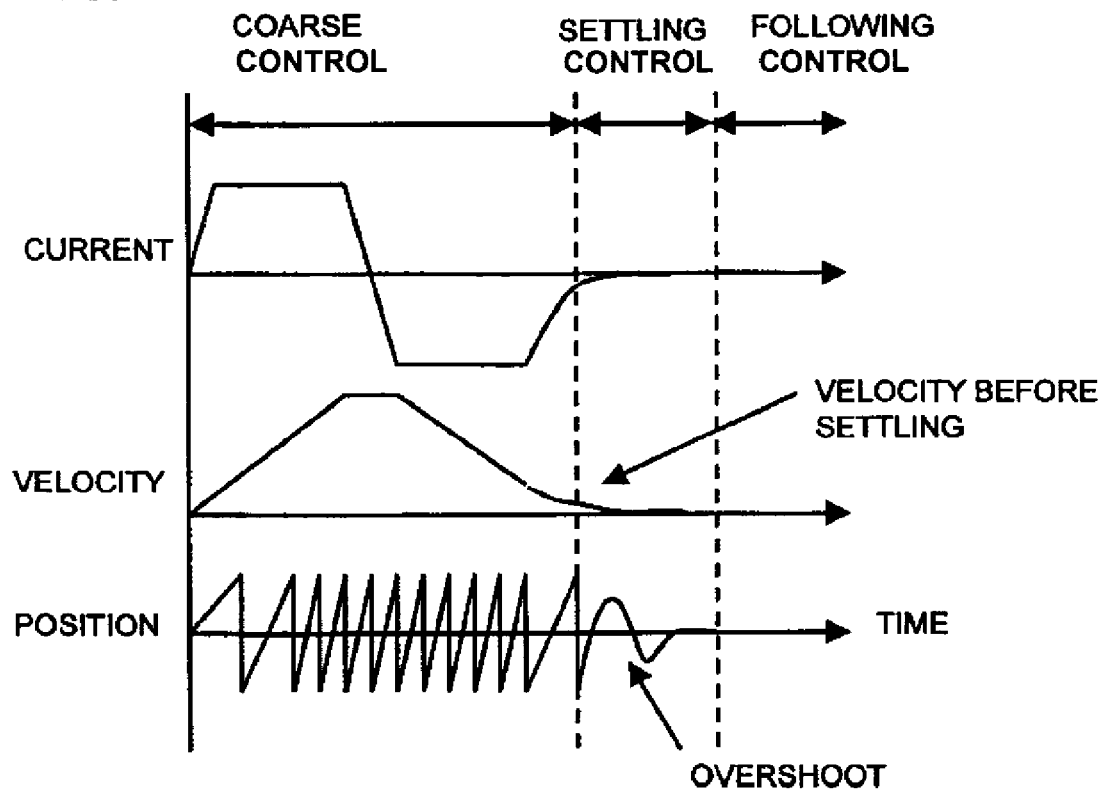
FIG. 4 is a diagram depicting the seek operation of the head in FIG. 1.

FIG. 1 is a block diagram depicting the disk device according to an embodiment of the present invention, FIG. 2 is a diagram depicting the arrangement of the position signals of the magnetic disk in FIG. 1; FIG. 3 is a diagram depicting the position signals of the magnetic disk in FIG. 1 and FIG. 2, and FIG. 4 is a diagram depicting the head positioning control in FIG. 1.

FIG. 1 shows a magnetic disk device as a disk device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on the slider, and write element, including the write coil, stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1, and drives the VCM 1.

A microcontroller (MCU) 14 detects (demodulates) the current position from the digital position signals from the position detection circuit 7, and calculates the VCM drive instruction value according to the error between the detected current position and the target position. In other words, the microcontroller 14 performs position demodulation and servo control including disturbance suppression described in FIG. 5 and later. A read only memory (ROM) 13 stores the control program of the MCU 14. A random access memory (RAM) 12 stores the data for processing of the MCU 14.

A hard disk controller (HDC) 11 judges a position in one track based on the sector number of the servo signal, and records/reproduces the data. A random access memory (RAM) for the buffer 15 temporarily stores the read data or write data. The HDC 11 communicates with a host via an interface IF, such as USB (Universal Serial Bus), ATA or SCSI (Small Computer System Interface). A bus 9 connects these composing elements.

As FIG. 2 shows, on the magnetic disk 4, servo signals (position signals) 16 are arranged in each track in the circumference direction from the outer circumference to the inner circumference with an equal interval. Each track has a plurality of sectors, and the solid lines in FIG. 2 indicate a position where the servo signals 16 are recorded. As FIG. 3 shows, the position signal is comprised of a servo mark ServoMark, track number GrayCode, index Index and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and the offset information PosA, PosB, PosC and PosD. Also the position of the magnetic head in the circumference direction is acquired based on the index signal Index.

For example, the sector number when the index signals is detected is set to No. 0, which is counted up every time the servo signal is detected, so as to acquire the sector number of each sector of the track. The sector number of the servo signal is used as a reference when data is recorded and reproduced. There is one index signal in one track. The sector number may be set instead of the index signal.

FIG. 4 shows an example of the seek control of the actuator executed by the MCU 14 in FIG. 1. The MCU 14 confirms the position of the actuator through the position detection circuit 7 in FIG. 1, performs servo computation, and supplies appropriate current to the VCM 1. FIG. 4 shows the transition of the control from the start of seeking when the head 3 is moved from a certain track position to the target track position, current of the actuator 1, velocity of the actuator (head), and position of the actuator (head).

In other words, in seek control, the head is moved to the target position through the transition from coarse control, settling control and following control. The coarse control is basically a velocity control, and settling control and following control are basically position controls for both of which the current position of the head must be detected.

To confirm the position like this, the servo signals are recorded on the magnetic disk in advance, as mentioned in FIG. 2. In other words, as FIG. 3 shows, servo marks which indicate the start position of the servo signal, gray code which indicates the track number, index signal, and signals PosA-PosD which indicate the offset are recorded on the magnetic disk in advance. These signals are read by the magnetic head, and these servo signals are converted into digital values by the position detection circuit 7.

First Embodiment of Disturbance Observer

Figure 5:
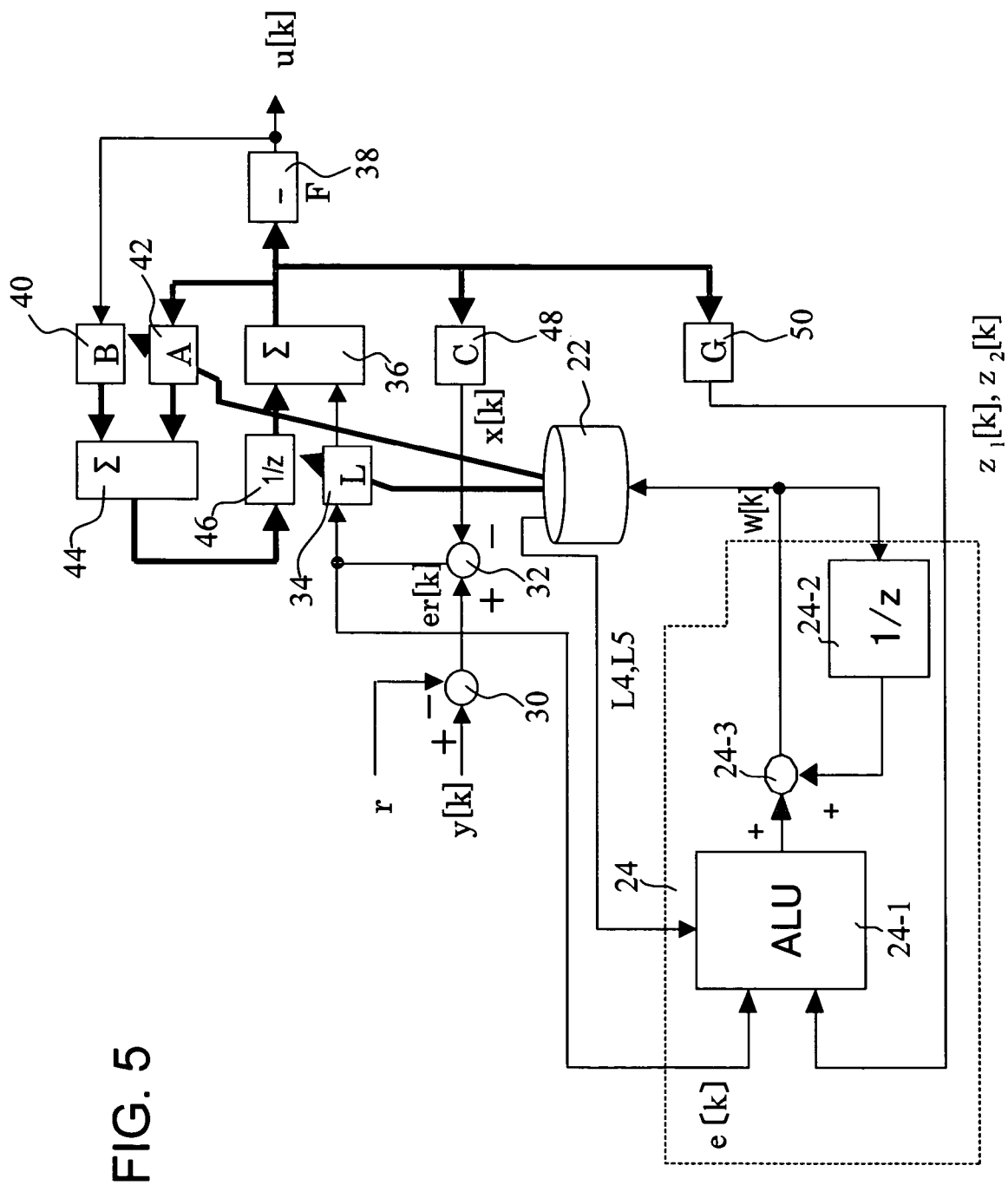
FIG. 5 is a block diagram depicting a disturbance observer control system according to an embodiment of the present invention.

FIG. 5 is a block diagram depicting a first embodiment of the positioning control system for suppressing the disturbance which is executed by the MCU 14 in FIG. 1. This positioning control system is an observer control system which detects the disturbance frequency, and suppresses the periodic disturbance by adaptive control.

The current observer shown in FIG. 5 is the observer shown in the following Expressions (1), (2) and (3).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix}(y(k) - x(k)) \quad (1)$$

$$u(k) = -\begin{pmatrix} F1 & F2 & F3 & F4 & F5 \end{pmatrix}\begin{pmatrix} x(k) \\ v(k) \\ b(k) \\ z1(k) \\ z2(k) \end{pmatrix} \quad (2)$$

$$\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a12 \\ 0 & 0 & 0 & a21 & a22 \end{pmatrix}\begin{pmatrix} x(k) \\ v(k) \\ b(k) \\ z1(k) \\ z2(k) \end{pmatrix} + \frac{Bl}{m}\frac{1}{Lp}T^2\begin{pmatrix} 1/2 \\ 1 \\ 0 \\ 0 \\ 0 \end{pmatrix}u(k) \quad (3)$$

The configuration in FIG. 5 will now be described with reference to Expressions (1), (2) and (3). The first computing block 30 computes the actual position error er [k] by subtracting the target position "r" from the observation position y [k] acquired by demodulating the above mentioned servo information read by the head 3. The second computing block 32 computes the estimated position error e [k] from the estimated position of the observer using the actual position error er [k].

This estimated position error e [k] is input to the state estimation block 34, and the estimated correction value (right hand side of Expression (1)) is computed using the estimated gain L (L1, l2, L3, L4, L5). And the estimated correction value is added to the state quantity (left hand side of Expression (1)) from the delay block 46 in the addition block 36, and the estimated position x [k], estimated velocity v [k], estimated bias value b [k], and estimated disturbance suppression values z1 [k] and z2 [k] are acquired as shown in Expression (1).

This estimated value is multiplied by the state feedback gain (−F) in the fourth computing block 38, and the drive value u [k] of the actuator 1 is acquired as shown in Expression (2). On the other hand, the estimated value of Expression (1) from the addition block 36 is multiplied by the estimated gain A (5×5 matrix of Expression (3)) in the fifth computing block 42, and the drive value u [k] of the fourth computing block 38 is multiplied by the estimated gain B (value which u [k] is multiplied by in Expression (3)) in the sixth computing block 42. Both of these multiplication results are added in the addition block 44, and the estimated state quantity of the next sample of Expression (3) is acquired.

The estimated state quantity of the next sample is input to the delay block 46 and is corrected by the estimated correction value in the state estimation block 34, as described above. And for the estimated value of Expression (1) from the addition block 36, the estimated position x [k] is acquired in the seventh computing block 48 and is input to the above mentioned second computing block 32.

In this observer, the disturbance adaptive control system is integrated. As FIG. 5 shows, the adaptive control systems for disturbance suppression 22 and 24 are integrated. To these adaptive control systems 22 and 24, the above mentioned estimated position error e [k] of the observer is input. The estimated position error e [k] of the observer is a difference between the actual position error (r−y [k]) of the computing block 30 and the estimated position x [k] of the observer.

As FIG. 6 shows, the disturbance suppression adaptive control system has a ω estimation section 24 for estimating the disturbance frequency according to the adaptive rule, and a table 22 for storing the estimated gains L and A according to the estimated frequency (angular frequency ω in this case). The ω estimation section 24 computes the estimated angular frequency ω1 [k] from the estimated position error e [k] using the following adaptive Expression (4).

$$\omega 1[k] = \omega 1[k-1] + Ka \cdot \frac{L5 \cdot z1[k] - L4 \cdot z2[k]}{z1[k]^2 + z2[k]^2} e[k] \quad (4)$$

This adaptive expression has an integration form which adaptively corrects the estimated angular frequency ω1 [k−1] of the previous sample using the estimated disturbance gains L4 and L5 from the table 22, estimated disturbance values z1 [k] and z2 [k], and the estimated position error e [k]. Here Ka is a predetermined gain.

1/z in FIG. 5 indicates a delay by one sample T. The "z" is an operator z in z transformation, which is used for digital control. As FIG. 5 shows, the eighth computing block 50 acquires the estimated disturbance values z1 [k] and z2 [k] using the estimated value in Expression (1) from the addition block 36, and outputs them to the ω estimation section 24. The ω estimation section 24 has a computing section 24-1 for computing the second term (Ka . . . e [k]) of the ω adaptive expression of Expression (4), a delay section 24-2 for delaying the estimated ω [k] by one sample, and an addition section 24-3 for adding the delayed ω (ω [k−1]) and the computing result of the second term of the computing section 24-1. In other words, the ω estimation section 24 computes the adaptive expression of Expression (4).

The table 22, on the other hand, stores the values L1, L2, L3, L4 and L5, and a11, a12, a21 and a22 according to the value of each estimated angular frequency ω, as shown in FIG. 6. Using L1, L2, L3, L4 and L5 of the table 22, L1, L2, L3, L4 and L5 of the state estimation block 34 are changed according to the estimated angular frequency. And using a11, a12, a21 and a22 of the table 22, a11, a12, a21 and a22 (see Expression (3)) of the fifth computing block 42 are changed according to the estimated angular frequency. L4 and L5 of the table 22 are output to the ω estimation section 24.

In other words, the disturbance model and estimated gains are changed according to the disturbance (angular) frequency ω, without changing the status feedback gain F. Here not only the disturbance model for notch filter type shaping, but also all the other estimated gains of the observer are influenced. In other words, if the disturbance frequency ω or disturbance model changes, not only the estimated disturbance gains L4 and L5 of Expression (3), but also all of position, velocity and bias gains L1, L2 and L3 are influenced.

Figure 10:
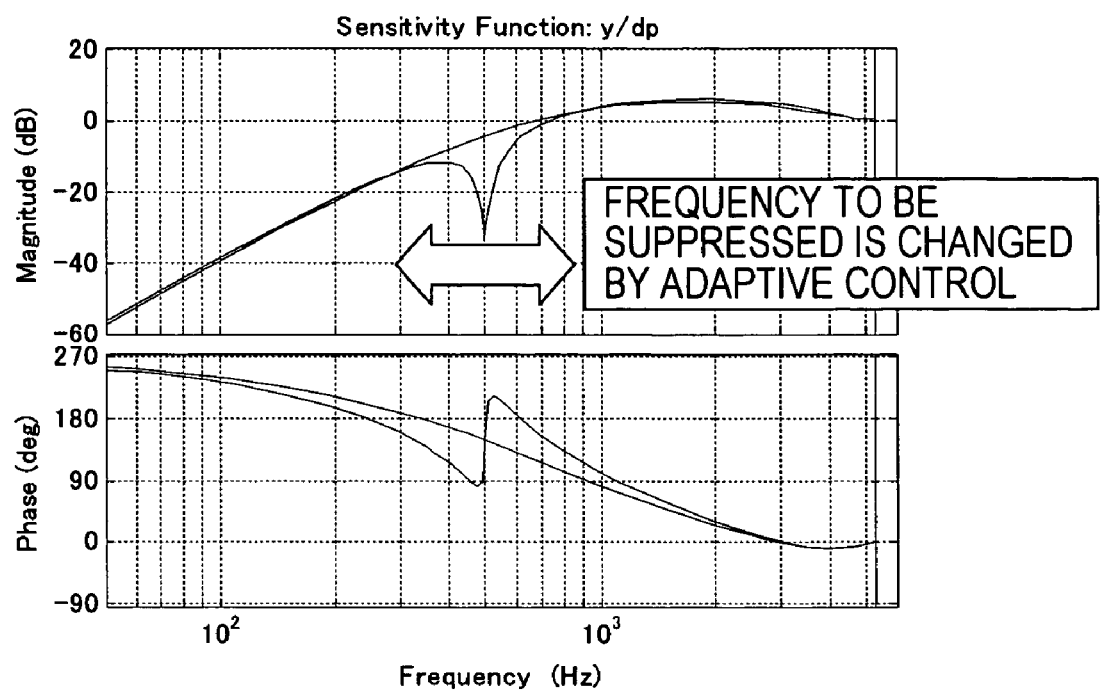
FIG. 10 is characteristic diagram of the sensitivity function in FIG. 5.

Particularly if the value ζ2 is large in pole assignment when the disturbance model is designed in the form of a shape filter (described later in FIG. 10), that is, if the width of the notch filter type suppression range is wide in frequency characteristic as shown in FIG. 10, this influence is high. Therefore it is necessary to change all the estimated gains from the estimated gain L1 to L5 according to the disturbance frequency.

The values of the estimated gains are computed by the pole assignment method, and are stored in the table 22 in advance. This will be described with reference to FIG. 6 to FIG. 9. FIG. 6 shows the values stored in table 22, FIG. 7 and FIG. 8 are graphs of the estimated gains L1, L2, L3, L4 and L5, and FIG. 9 are graphs of the disturbance model values a11, a12, a21 and a22.

Figure 8:
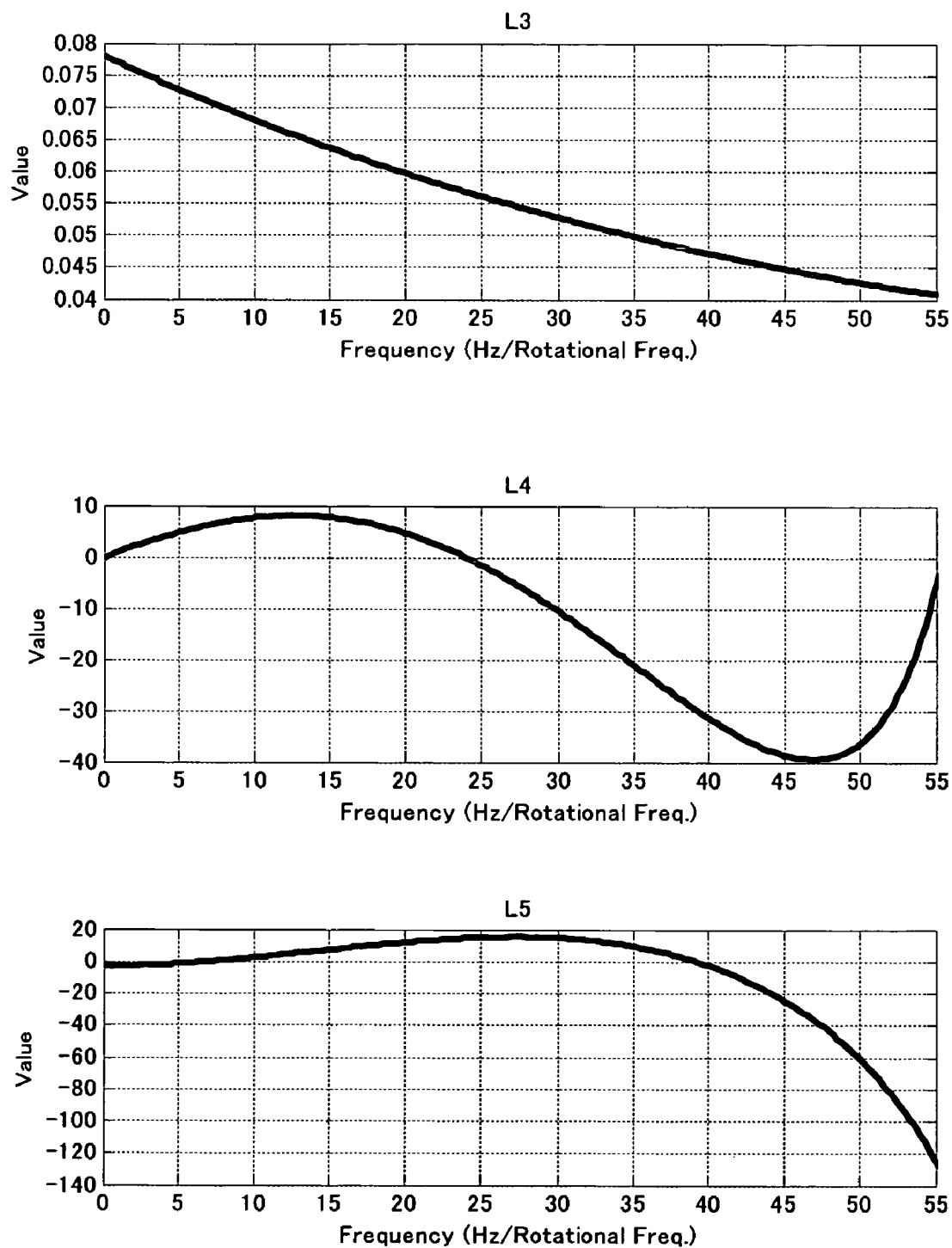
FIG. 8 is characteristic diagram depicting the estimated gains L3, L4 and L5 in FIG. 6.
Figure 9:
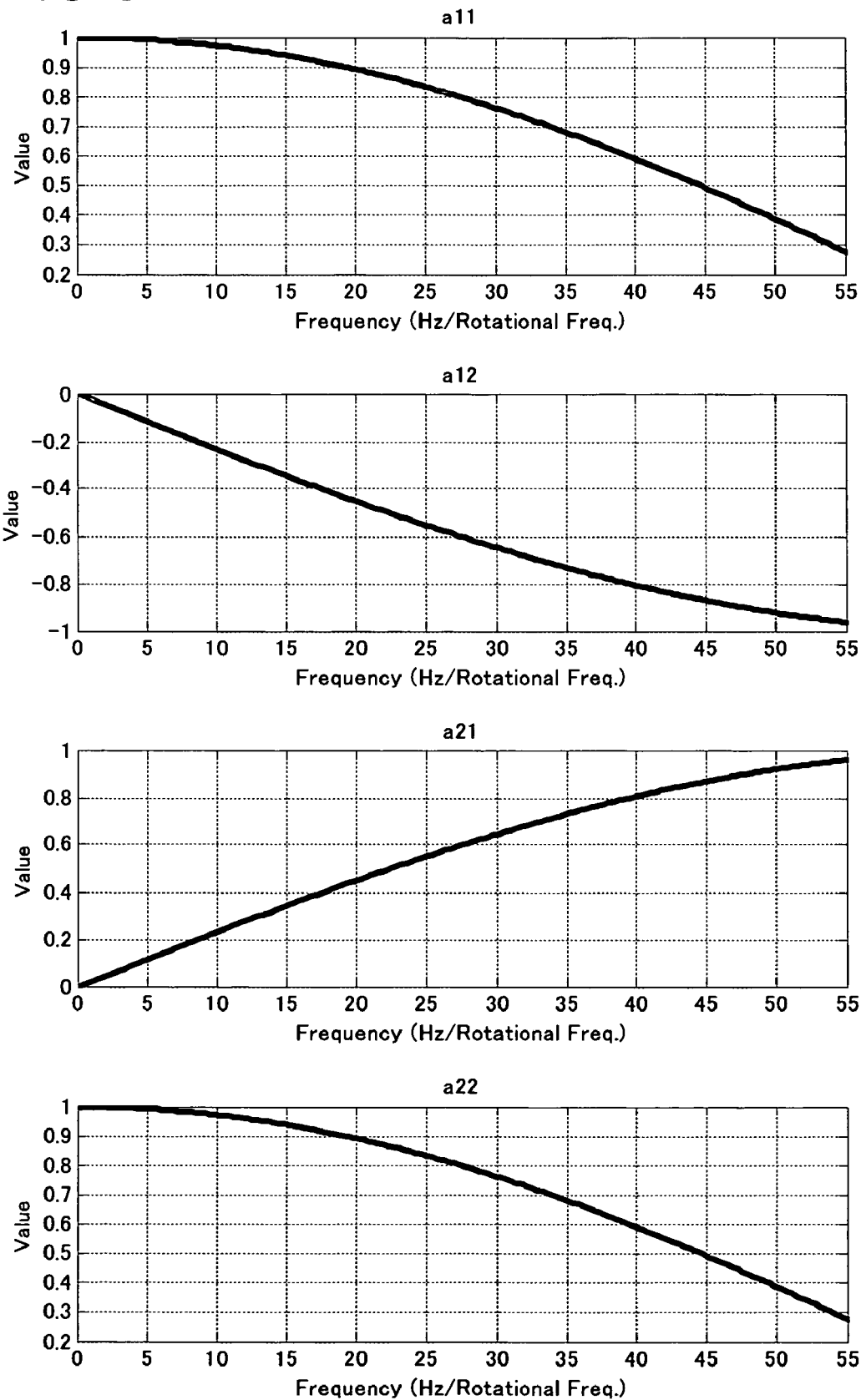
FIG. 9 is characteristic diagram depicting the estimated gains a11, a12, a21 and a22 in FIG. 6.

In FIG. 7 and FIG. 8, the abscissa is a frequency when the disturbance frequency is divided by the rotational frequency of the disk so as to be normalized, and the ordinate is a value of the estimated gains L1, L2, L3, L4 and L5. In FIG. 9 as well, the abscissa is a frequency when the disturbance frequency is divided by the rotational frequency of the disk so as to be normalized, and the ordinate is the value of the disturbance model values a11, a12, a21 and a22.

As the sensitivity function characteristics in FIG. 10 show, the central frequency of the notch filter type suppression characteristics is sequentially identified and changed by adaptive control. The top graph in FIG. 10 shows the characteristics of frequency versus magnitude, and the bottom graph in FIG. 10 shows the characteristics of frequency versus phase. In other words, the frequency to be suppressed is controlled by adaptive control according to the disturbance frequency that fluctuates.

FIG. 6 shows an estimated gain table 22 which corresponds to one disturbance frequency fluctuation. In this case, all the estimated gains of the observer must be corrected, as mentioned above. For this, an estimated gain is stored in the table in advance for each disturbance frequency shown in FIG. 7 to FIG. 9.

However, an infinite number of values cannot be held in the table 22, so the disturbance frequency values are stored at every predetermined frequency. The disturbance frequencies there between are interpolated. For example, in FIG. 6, values are stored at every frequency, which is an integral multiple of the rotational angular frequency in FIG. 6.

Further, to remove the offset, it is preferable to change the adaptive rule used for the ω estimation section 24, not to the integral rule in Expression (4) but to the adaptive rule of integration+double-integration shown in the following Expression (5).

$$E[k] = \frac{L5 \cdot z1[k] - L4 \cdot z2[k]}{z1[k]^2 + z2[k]^2} e[k] \quad (5)$$

$$z3[k] = z3[k-1] + E[k]$$

$$\omega1[k] = \omega1[k-1] + Ka \cdot E[k] + Kb \cdot z3[k].$$

In Expression (5), E [k] is calculated by the estimated disturbance gains L4 and L5, estimated disturbance values z1 [k] and z2 [k], and estimated position error e [k], z3 [k] is calculated by E [k] and z3 [k−1] of the previous sample, and ω1 [k] is determined by adding E [k] and z3 [k] to ω1 [k−1] of the previous sample. In other words, this is an adaptive rule of integration by E [k] and double-integration by z3 [k]. Ka and Kb are predetermined gains. Offset is removed by adding this double-integration.

Figure 11:
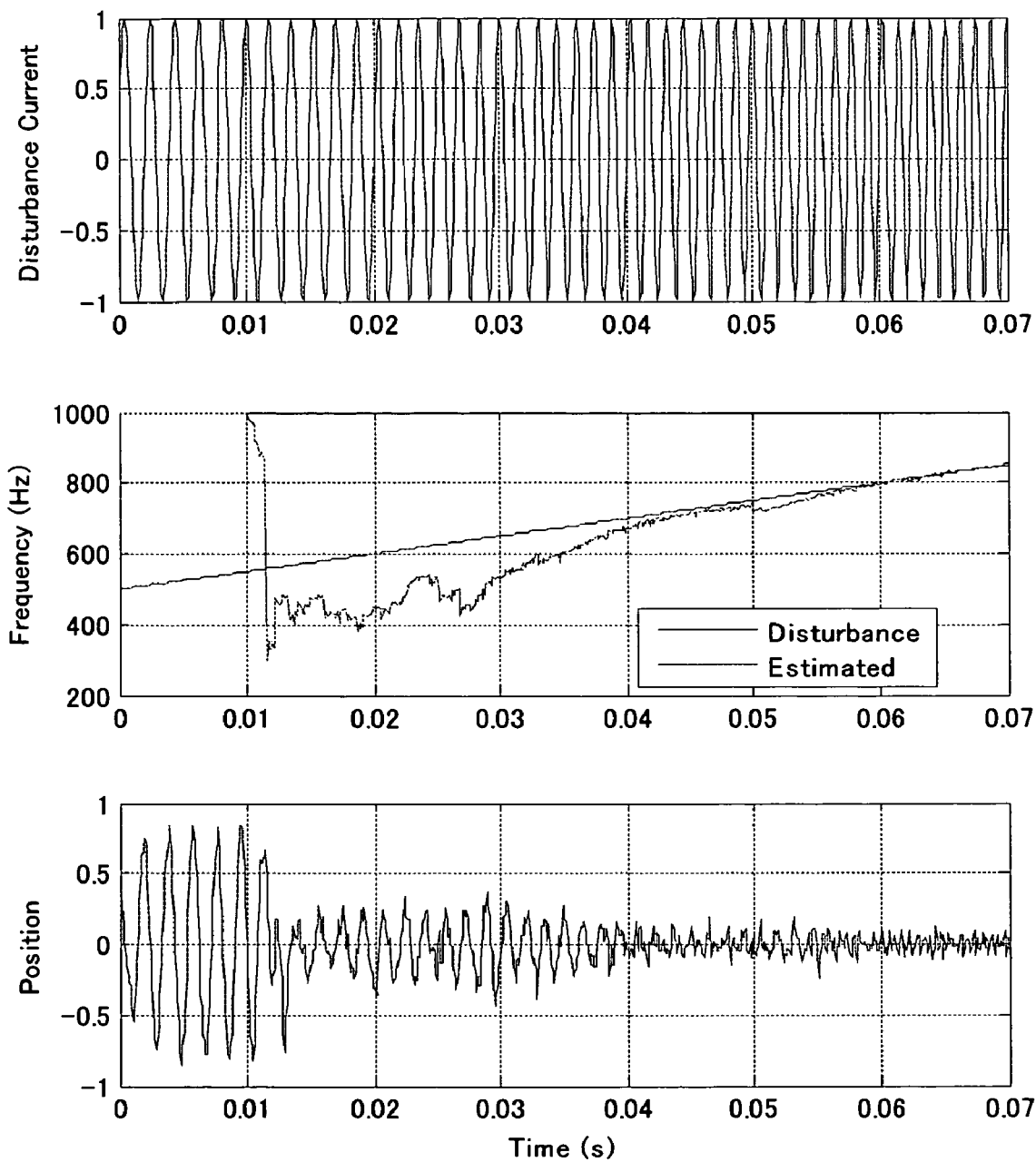
FIG. 11 is diagram depicting the simulation result of the disturbance following characteristics of the configuration in FIG. 5.

FIG. 11 is diagram depicting the simulation result when the adaptive expression of Expression (5) is used in the configuration in FIG. 1 and FIG. 5. In FIG. 11, the abscissa is time, and the top graph in FIG. 11 shows the disturbance current to be applied, and the middle graph shows the disturbance frequency and estimated disturbance frequency, and the bottom graph shows the head position corresponding thereto.

As the middle graph in FIG. 11 shows, the initial frequency of adaptive control is 1000 Hz indicated by the solid line, and the adaptive control is turned ON at 0.01 seconds later, and the disturbance frequency is increased from 500 Hz in proportion to time, as shown by the dotted line. As the solid line shows, the adaptive control follows up to the fluctuation of disturbance frequency in an early stage. In other words, in this example, the adaptive control matches the disturbance frequency at 0.04 second later. In the head position, shown in the bottom graph, as well, the amplitude before starting the adaptive control decreased soon after the adaptive control is turned ON, and follows up to the disturbance frequency.

In this way, the characteristic of a wide suppression width can be implemented, and the frequency changes in proportion to time, in other words, follow up to the chirp signal type disturbance becomes possible. Follow up is possible even in the prior art, but the adaptive gain cannot be set high. This is because in the above mentioned configuration, only the estimated disturbance gains L4 and L5 of the control system are changed, and estimated gains L1 to L3, such as position gains, are not changed.

If an attached controller for disturbance suppression is used while maintaining the original characteristics of the controller, the width of the suppression range cannot help becoming narrow. Therefore even if the conventional adaptive control is changed, the adaptive gain cannot help becoming small, which deteriorates the follow up performance to the chirp signal.

In the present invention, only the estimated gain L of the observer is changed without changing the state feedback gain F. As mentioned above, this configuration is preferable to maintain the pole assignment of the controller. Therefore even if a high adaptive gain is set, follow up is possible without disturbance.

Second Embodiment of Disturbance Observer

Figure 12:
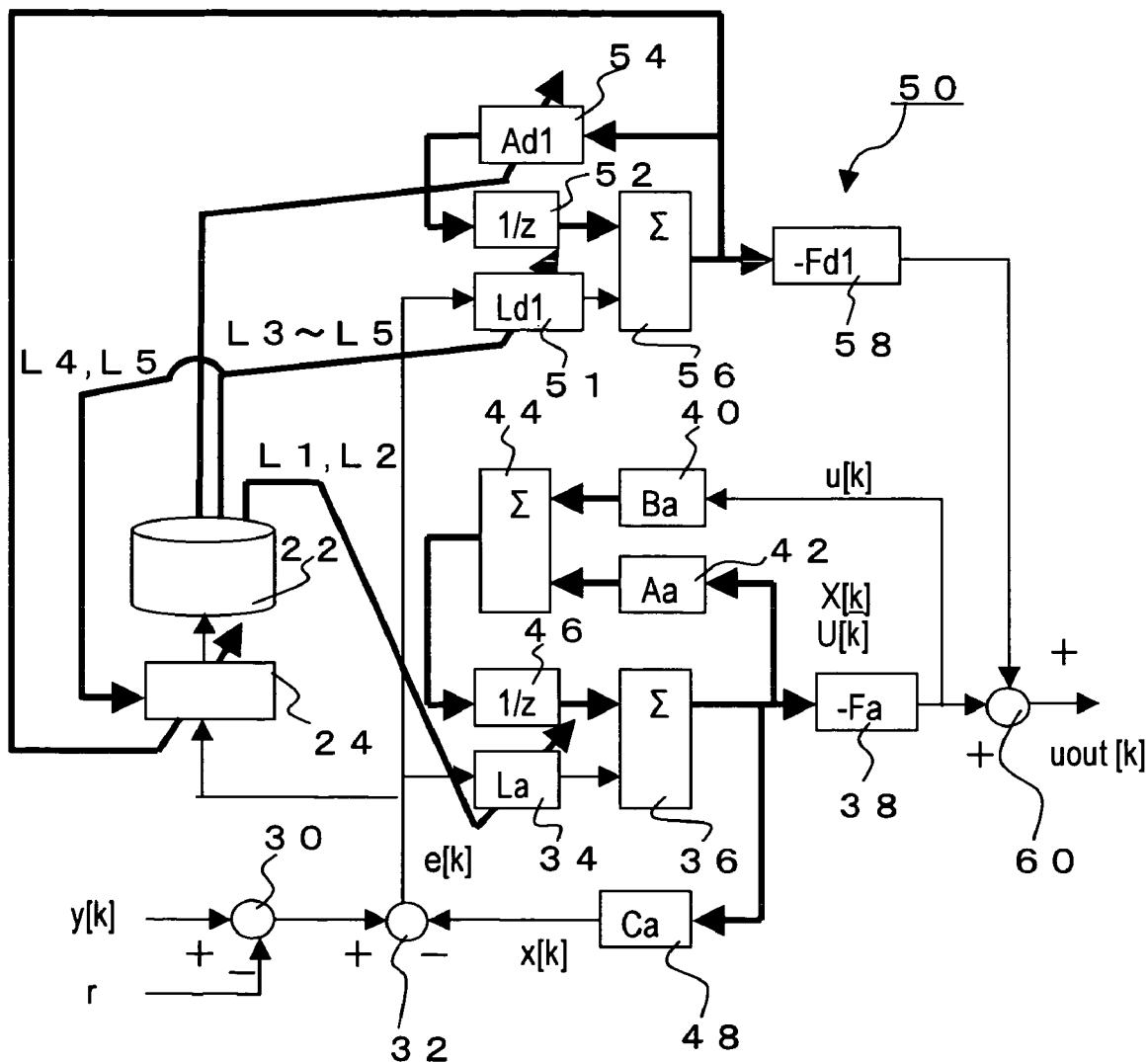
FIG. 12 is a block diagram depicting a disturbance observer control system according to another embodiment of the present invention.

FIG. 12 is a block diagram of the second embodiment of the positioning control system for disturbance suppression which is executed by the MCU 14 in FIG. 1. This positioning control system is an observer control system for detecting the disturbance frequency and suppressing periodic disturbance by adaptive control.

This current observer shown in FIG. 12 is the observer shown in Expressions (6), (7), (8) and (9).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix}(y(k) - x(k)) \quad (6)$$

$$u(k) = -(F1 \quad F2)\begin{pmatrix} x(k) \\ v(k) \end{pmatrix} \quad (7)$$

$$uout(k) = u(k) - (F3 \quad F4 \quad F5)\begin{pmatrix} b(k) \\ z1(k) \\ z2(k) \end{pmatrix} \quad (8)$$

$$\begin{pmatrix} x(k+1) \\ v(k+1) \end{pmatrix} = \begin{pmatrix} 1 & 1 \\ 0 & 1 \end{pmatrix}\begin{pmatrix} x(k) \\ v(k) \end{pmatrix} + \frac{Bl}{m}\frac{1}{Lp}T^2\begin{pmatrix} 1/2 \\ 1 \end{pmatrix}u(k) \quad (9)$$

$$b(k+1) = b(k)$$

$$\begin{pmatrix} z1(k+1) \\ z2(k+1) \end{pmatrix} = \begin{pmatrix} a11 & a12 \\ a21 & a22 \end{pmatrix}\begin{pmatrix} z1(k) \\ z2(k) \end{pmatrix}$$

This embodiment is an example of an adaptive control system where the disturbance model in FIG. 5 is separated. By correcting the model of the observer when the analog control system is converted into a digital control system, the configuration in which the disturbance is separated can be implemented, as shown in Expressions (7), (8) and (9).

In FIG. 12, composing elements the same as FIG. 5 are denoted with the same reference symbols, and just like FIG. 5, the first computing block 30 computes the actual position error er [k] by subtracting the target position "r" from the observation position y [k] acquired by demodulating the servo information read by the head 3. The second computing block 32 computes the estimated position error e [k] from the estimated position x [k] of the observer using the actual position error er [k].

The estimated position error e [k] is input to the state estimation block 34, and the estimated correction value (right hand side of Expression (6)) is computed using the estimated gain La (L1, L2, L3). And this value is added with the state quantity (left hand side of Expression (6)) from the delay block 46 in the addition block 36, and the estimated position x [k] and estimated velocity v [k] are acquired, as shown in Expression (6).

The estimated values x [k] and v [k] are multiplied by the state feedback gain (−Fa=F1, F2) in the fourth computing block 38, and the first drive value u [k] of the actuator 1 is acquired, as shown in Expression (7). On the other hand, the estimated values x [k] and v [k] in Expression (6) from the addition block 36 are multiplied by the estimated gain Aa (2×2 matrix (1, 0) in Expression (9)) in the fifth computing block 42, and the drive value u [k] of the fourth computing block 38 is multiplied by the estimated gain Ba (a value which u [k] is multiplied in Expression (9)) in the sixth computing block 40. These multiplication results are added in the addition block 44, and the estimated state quantity x [k+1] and v [k+1] of the next sample in Expression (9) are acquired.

The estimated state quality of this next sample is input to the delay block 46, as mentioned above, and corrected by the estimated correction value in the state estimation block 34. For the estimated value of Expression (1) from the addition block 36, the estimated position x [k] is acquired in the seventh computing block 48, and is input to the above mentioned second computing block 32.

The estimated position error e [k] is input to the disturbance state estimation block 51, and the estimated correction value (right hand side of Expression (6)) is computed using the estimated gain Ld1 (L3, L4, L5). And this value is added with the state quantity (left hand side of Expression (6)) from the delay block 52 in the addition block 56, and the estimated disturbance suppression values b [k], z1 [k] and z2 [k] are acquired, as shown in Expression (6).

The estimated values b [k], z1 [k] and z2 [k] are multiplied by the state feedback gain (Fd1=F3, F4, F5) in the eighth computing block 58, and the disturbance suppression drive value of the actuator 1 is acquired, as shown in Expression (8). On the other hand, the estimated values b [k], z1 [k] and z2 [k] of Expression (6) from the addition block 56 are multiplied by the estimated gain Ad1 (gain of b [k] in Expression (9) and the gain of 2×2 matrix A) in the ninth computing block 54, and are input to the delay block 52, and the estimated values b [k+1], z1 [k+1] and z2 [k+1] of the next sample are acquired.

And in the addition block 60, the disturbance suppression drive value is subtracted from the drive value u [k], and the output drive value uout [k] of Expression (8) is acquired.

In other words, Expression (1), (2) and (3) and Expressions (6), (7), (8) and (9) are compared, and the gain indicated by the matrix in Expression (3) is separated into the controller model and the disturbance model, and is developed into Expression (9), and gain F of Expression (2) is separated into the controller model and the disturbance model, and developed into Expressions (7) and (8).

Expression (1) and Expression (6) have the same form, but are computed in different blocks 34 and 51 according to the developed expressions.

Just like FIG. 5, the disturbance adaptive control systems 22 and 24 are integrated into this observer. The estimated position error e [k] of the observer is input to the adaptive control systems 22 and 24. The estimated position error e [k] of the observer means the difference of the actual position error (r−y [k]) of the computing block 30 and the estimated position x [k] of the observer.

As FIG. 12 shows, the disturbance suppression adaptive control system has a ω estimation section 24 for estimating the disturbance frequency according to the adaptive rule, and table 22 for storing the estimated gains L and A according to the estimated frequency (angular frequency ω in this case), just like FIG. 5. The ω estimation section 24 computes the estimated angular frequency ω1 [k] from the estimated position error e [k] using the above mentioned Expressions (4) and (5).

The table 22, on the other hand, stores the values L1, L2, L3, L4 and L5, and a11, a12, a21 and a22 according to the value of each established angular frequency ω as shown in FIG. 6. L1 and L2 of the state estimation block 32 are changed by L1 and L2 in this table 22, and L3, L4 and L5 of the state estimation block 51 are changed by L3, L4 and L5 of the table 22 according to the estimated angular frequency. Also by a11, a12, a21 and a22 of this table 22, a11, a12, a21 and a22 (see Expression (9)) of the computing block 54 are changed according to the estimated angular frequency. Also L4 and L5 of the table 22 are output to the ω estimation section 24.

In other words, according to the disturbance (angular) frequency ω, the disturbance model and the estimated gain are changed without changing the state feedback gain F. Here in the estimated gains of the observer, not only the disturbance model for notch filter type shaping, but also all the other estimated gains are influenced. In other words, if the disturbance frequency ω or disturbance model is changed, not only the estimated disturbance gains L4 and L5 of Expression (6), but also all of the position, velocity and bias gains L1, l2 and L3 are influenced.

Third Embodiment of Disturbance Observer

Figure 13:
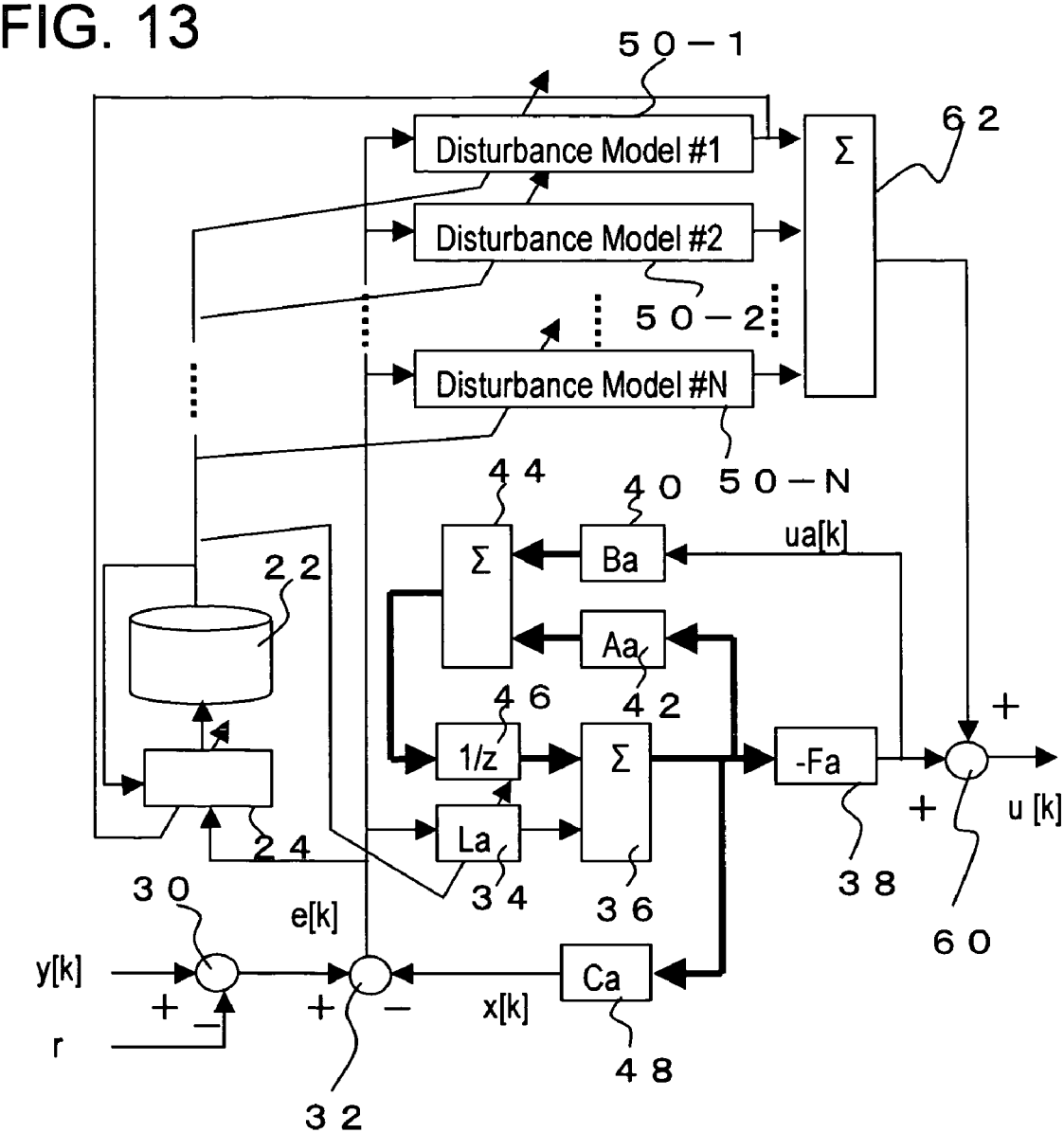
FIG. 13 is a block diagram depicting a disturbance observer control system according to the other embodiment of the present invention.
Figure 14:
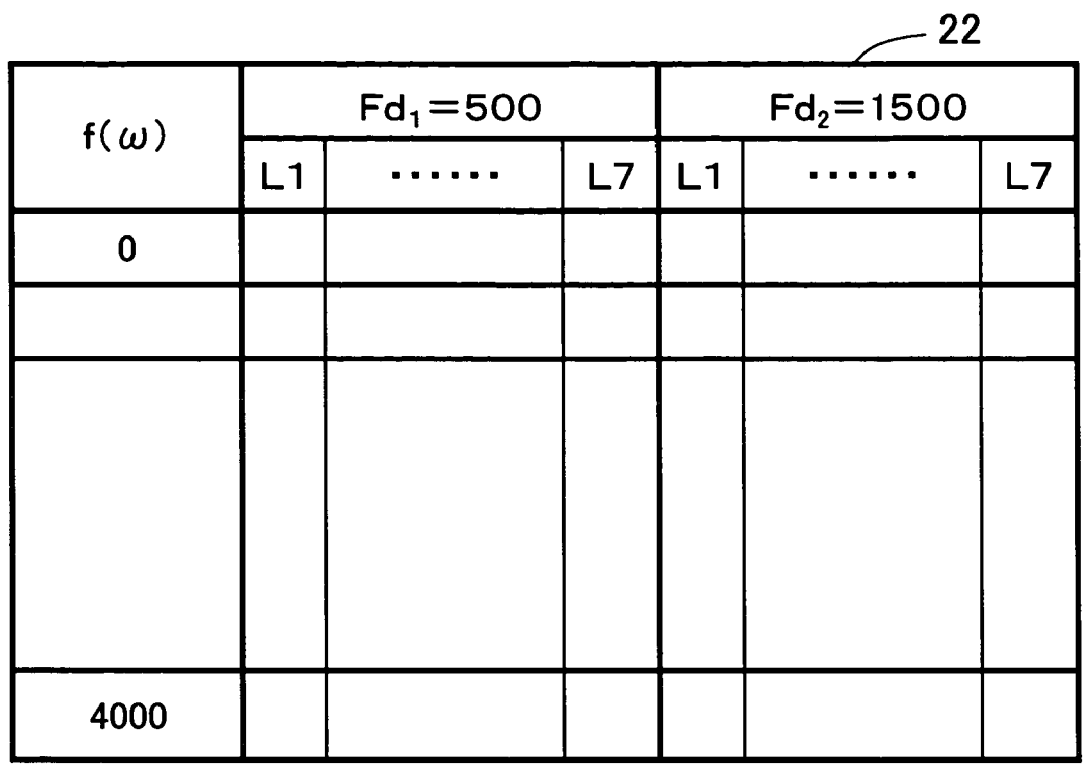
FIG. 14 shows the configuration of the estimated gain table in FIG. 13.
Figure 15:
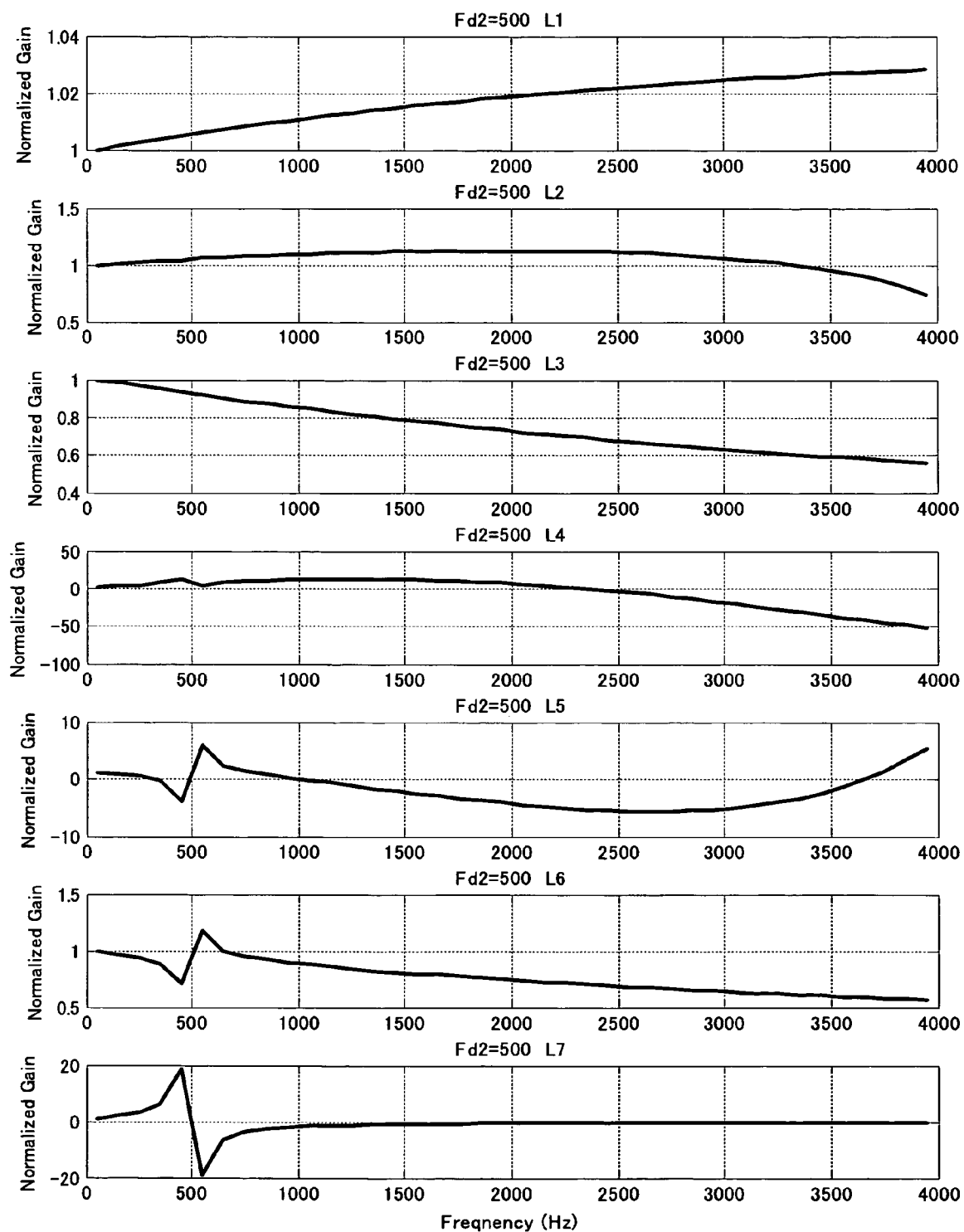
FIG. 15 is characteristic diagram depicting the estimated gains L1-L7 in FIG. 14 in the first disturbance frequency.
Figure 16:
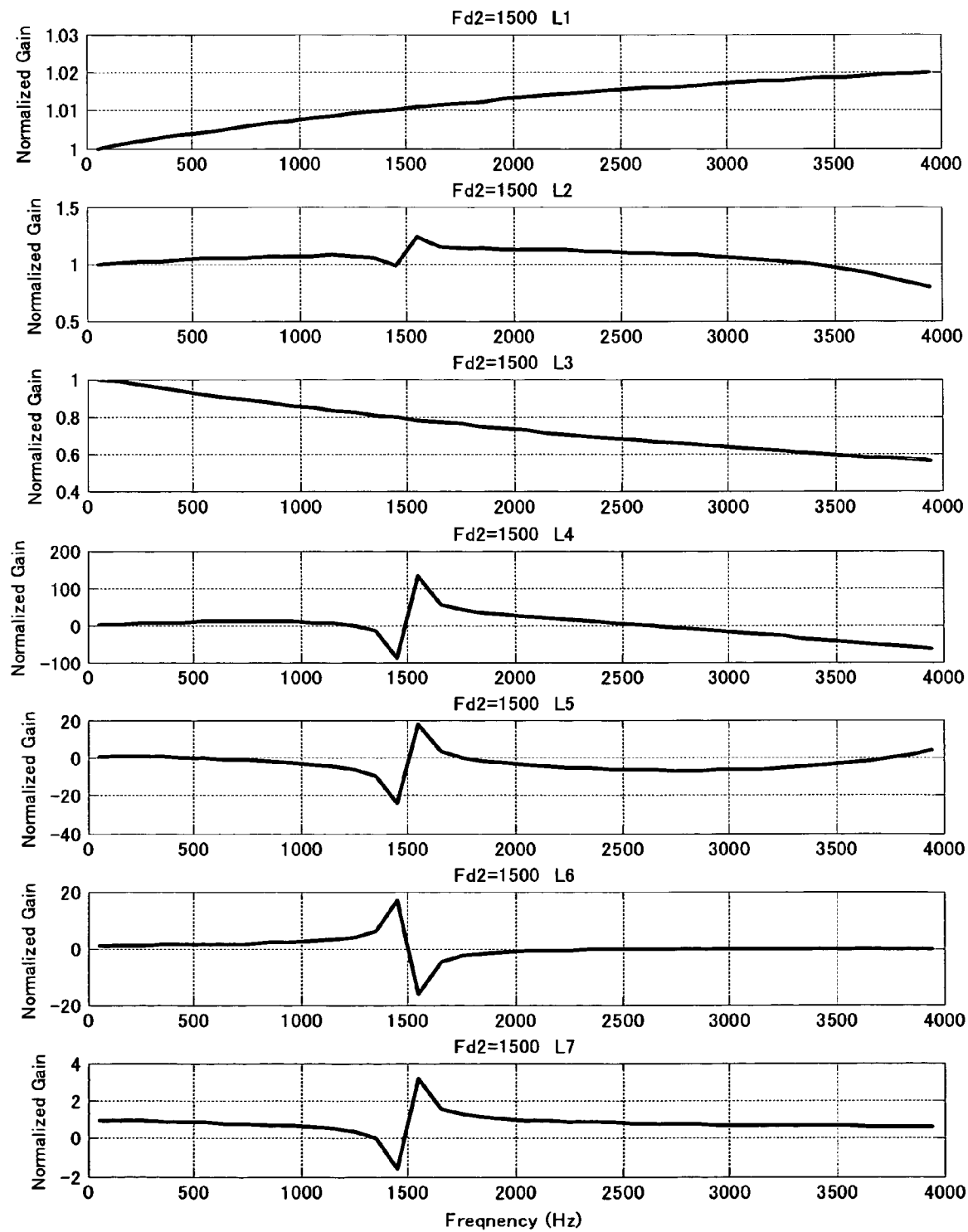
FIG. 16 is characteristic diagram depicting the estimated gains L1-L7 in FIG. 14 in the second disturbance frequency.

FIG. 13 is a block diagram depicting the third embodiment of the positioning control system for disturbance suppression which is executed by the MCU 14 in FIG. 1. FIG. 14 shows the table 22 in FIG. 13, and FIG. 15 and FIG. 16 are diagrams depicting the estimated gains L in the table 22.

The positioning control system is an observer control system which detects the disturbance frequency, and suppresses the periodic disturbance by adaptive control, and an adaptive control system in which a plurality of disturbance models in FIG. 12 are separated and set.

In FIG. 13, composing elements the same as FIG. 5 and FIG. 12 are denoted with the same reference symbols, and each of the disturbance models 50-1, . . . , 50-N is comprised of the disturbance control models 51, 52, 54, 56 and 58 shown in FIG. 12.

Each disturbance model 50-1, . . . , 50-N is provided for each disturbance frequency which must be followed up. The operation of this model is the same as FIG. 12, and description thereof is omitted.

An observer having two disturbance models is acquired using the following Expressions (10)-(13) by expanding Expressions (6)-(9).

$$\begin{pmatrix} x(k) \\ v(k) \\ b(k) \\ z1(k) \\ z2(k) \\ z3(k) \\ z4(k) \end{pmatrix} = \begin{pmatrix} x(k) \\ v(k) \\ b(k) \\ z1(k) \\ z2(k) \\ z3(k) \\ z4(k) \end{pmatrix} + \begin{pmatrix} L1 \\ L2 \\ L3 \\ L4 \\ L5 \\ L6 \\ L7 \end{pmatrix} (y(k) - x(k)) \quad (10)$$

$$u(k) = -(F1 \quad F2)\begin{pmatrix} x(k) \\ v(k) \end{pmatrix} \quad (11)$$

$$uout(k) = u(k) - (F3 \quad F4 \quad F5 \quad F6 \quad F7)\begin{pmatrix} b(k) \\ z1(k) \\ z2(k) \\ z3(k) \\ z4(k) \end{pmatrix} \quad (12)$$

$$\begin{pmatrix} x(k+1) \\ v(k+1) \end{pmatrix} = \begin{pmatrix} 1 & 1 \\ 0 & 1 \end{pmatrix}\begin{pmatrix} x(k) \\ v(k) \end{pmatrix} + \frac{Bl}{m}\frac{1}{Lp}T^2\begin{pmatrix} 1/2 \\ 1 \end{pmatrix}u(k) \quad (13)$$

$$b(k+1) = b(k)$$

$$\begin{pmatrix} z1(k+1) \\ z2(k+1) \end{pmatrix} = \begin{pmatrix} a11 & a12 \\ a21 & a22 \end{pmatrix}\begin{pmatrix} z1(k) \\ z2(k) \end{pmatrix}$$

$$\begin{pmatrix} z3(k+1) \\ z4(k+1) \end{pmatrix} = \begin{pmatrix} a11 & a12 \\ a21 & a22 \end{pmatrix}\begin{pmatrix} z3(k) \\ z4(k) \end{pmatrix}$$

FIG. 14 shows an estimated gain table 22 corresponding to two disturbance frequency fluctuations when two disturbance models are created in the configuration in FIG. 13. In FIG. 14, the disturbance frequency is described using an example of two disturbance frequencies Fd1=500 Hz and Fd2=1500 Hz.

Here L4 and L5 are the estimated disturbance gains of Fd1, and L6 and L7 are the estimated disturbance gains of Fd2.

FIG. 15 is a graph depicting the estimated disturbance gains L1, L2, L3, L4, L5, L6 and L7 computed by the pole assignment method while changing Fd1 when Fd2=500 Hz, and FIG. 16 is a graph depicting the estimated disturbance gains L1 to L7 computed by the pole assignment method while changing Fd1 when Fd2=1500 Hz.

In FIG. 15 and FIG. 16, the abscissa is the disturbance Fd1 and the ordinate is the values of the estimated gains L1, L2, L3, L4, L5, L6 and L7. The estimated gains L1 to L7 determined like this are stored in each frequency (angular frequency) f in the table 22 in FIG. 14 corresponding to Fd1=500 Hz and Fd2=1500 Hz, just like FIG. 6.

Fourth Embodiment of Disturbance Observer

Figure 17:
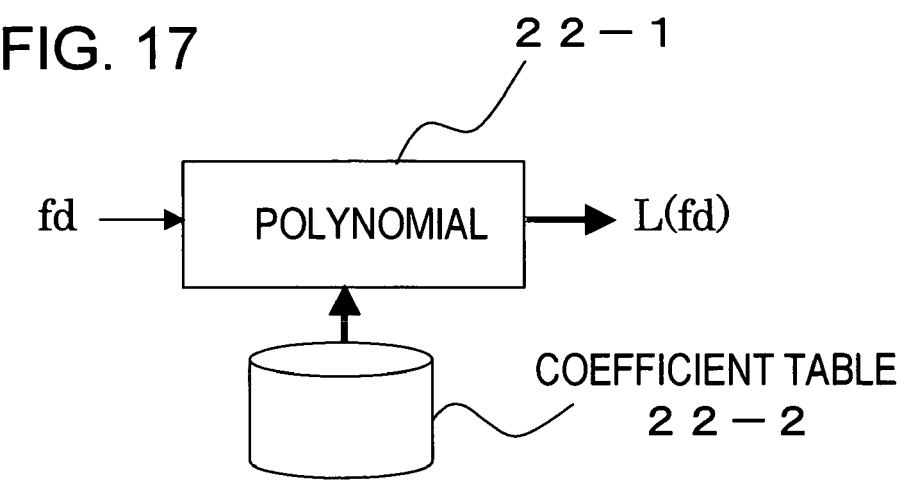
FIG. 17 is a block diagram depicting a disturbance observer control system according to still another embodiment of the present invention.

FIG. 17 is a diagram depicting the configuration of the disturbance observer according to the fourth embodiment of the present invention. Here a variant form of the table 22 in FIG. 6, FIG. 12 and FIG. 13 is shown.

In other words, this example is comprised of a computer 22-1 for determining an estimated gain by a polynomial corresponding to one disturbance frequency fd (ω) and coefficient table 22-2 thereof, instead of the table 22 in FIG. 12. For example, FIG. 18 shows an example of computing the estimated gain L from the estimated disturbance frequency using a quadratic approximate expression.

For example, the frequency of a pole of the disturbance model is "f", and the change of the estimated gain of the observer is approximated using the polynomial $a(n)*f(n)+a(n-1)*f(n-1)+\ldots+a(1)*f(1)+a(0)$ having coefficient from $a(0)$ to $a(n)$.

Figure 18:
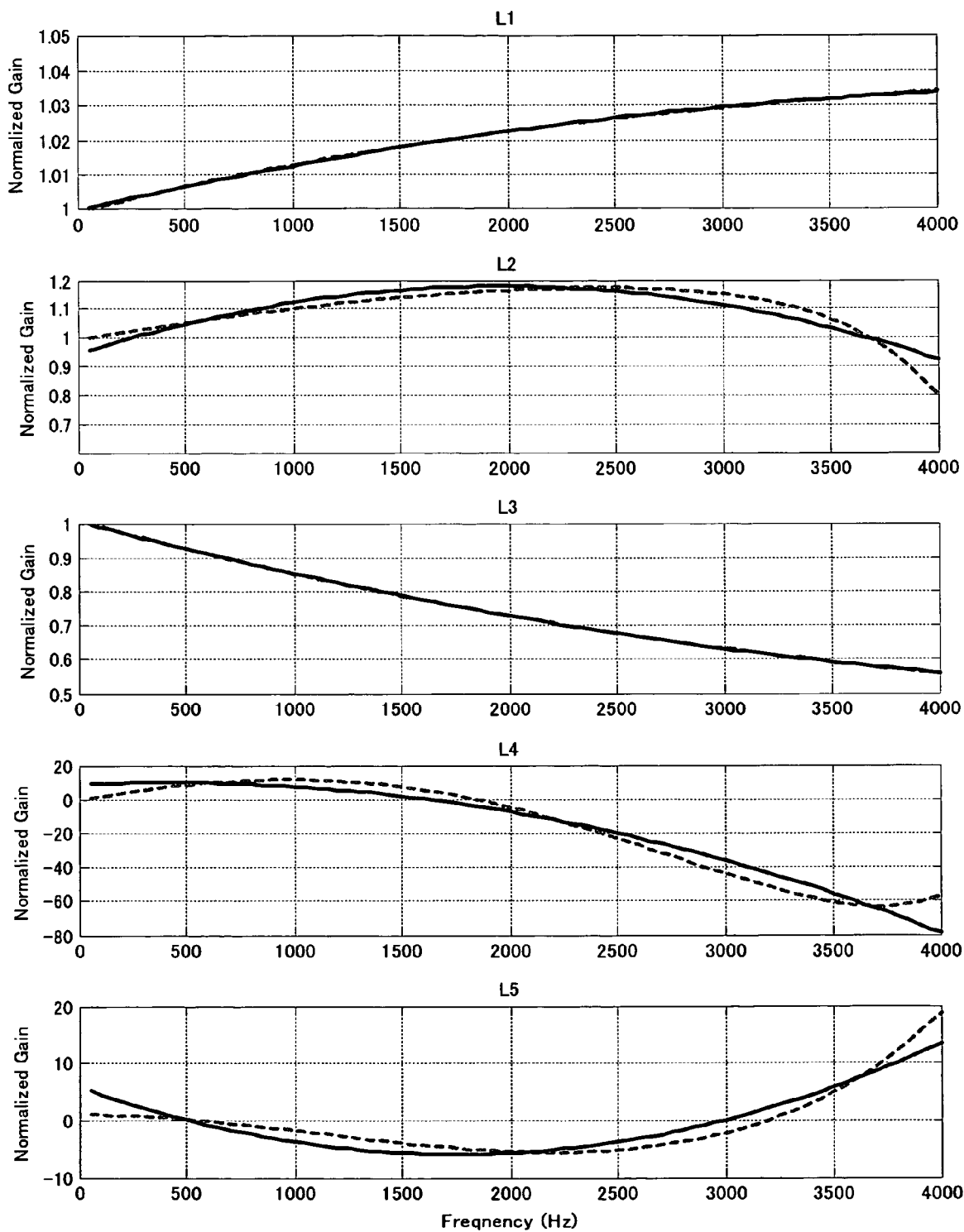
FIG. 18 are diagrams depicting the quadratic approximate expression in FIG. 17.

FIG. 18 is a case of quadratic approximation, and the abscissa indicates the frequency and the ordinate indicates the values of L1 to L5. The solid line is the case of quadratic approximation and the dotted line is the case when the above mentioned pole assignment method was used for computing.

Figure 19:
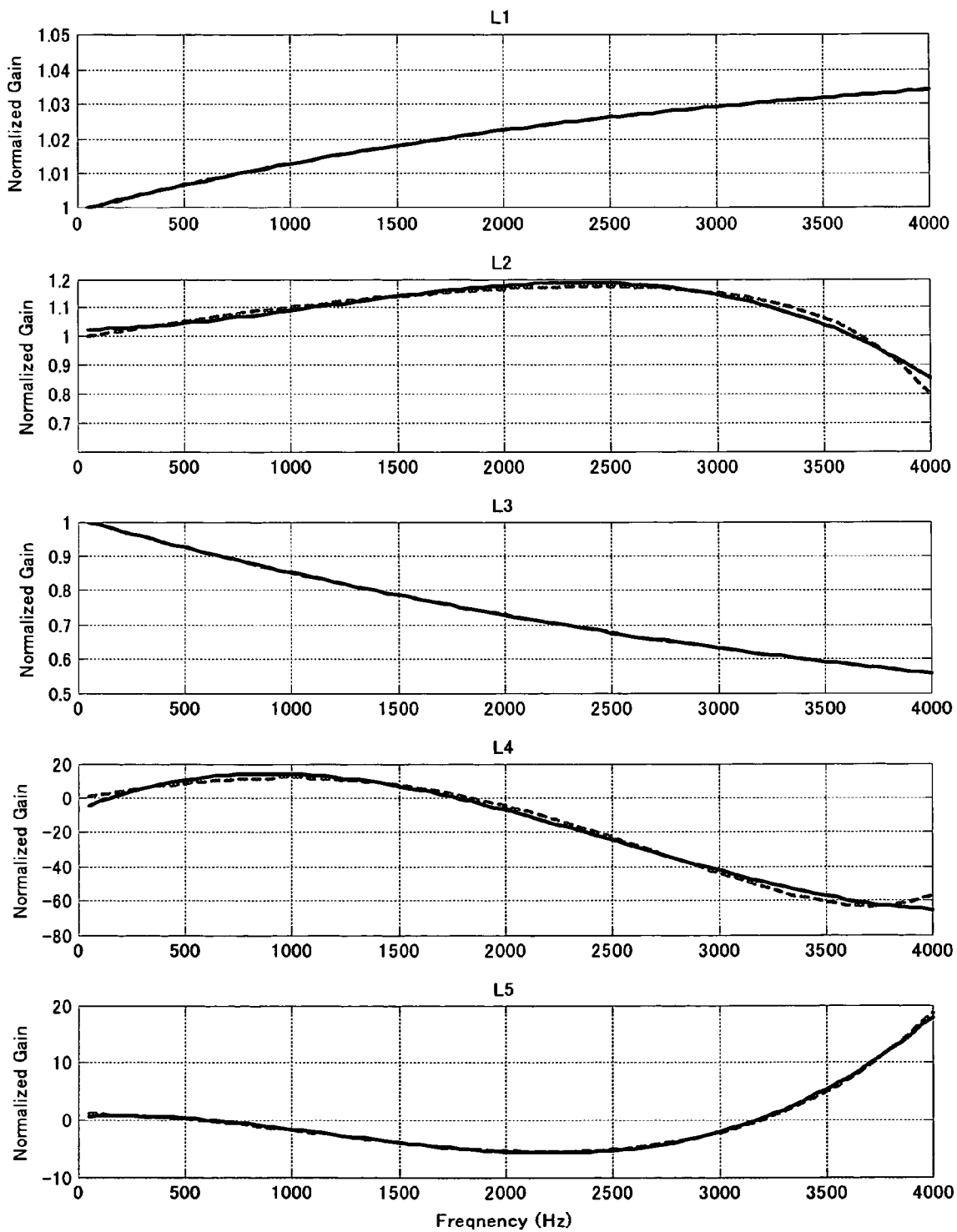
FIG. 19 is diagram depicting the cubic approximate expression in FIG. 17.

FIG. 19 is a case of cubic approximation, and the abscissa indicates the frequency and the ordinate indicates the values of L1 to L5. The solid line is the case of cubic approximation, and the dotted line is the case when the above mentioned pole assignment method was used for computing. As the degree increases, the shift decreases.

By using approximate expressions like this, the estimated gain according to the disturbance frequency can be output.

Other Embodiments

In the above embodiments, the disturbance observer control was described using an example of applying it to the head positioning device of a magnetic disk device, but the present invention can also be applied to other disk devices, such as optical disk devices. And any value can be used for the number of disturbance frequencies according to necessity.

The present invention was described using embodiments, but the present invention can be modified in various ways within the scope of the essential character thereof, and these variant forms shall not be excluded from the scope of the present invention.

When a control value of an actuator is computed using the estimated gain of the actuator and estimated gains of disturbance according to an estimated position error by disturbance observer control including a model of the actuator and a model of the disturbance, the disturbance frequency is estimated according to the estimated position error, and the estimated gain of the actuator and the estimated gain of the disturbance, corresponding to the disturbance frequency, are changed, therefore appropriate observer control according to the disturbance frequency can be implemented.

What is claimed is:

1. A head positioning control method for controlling positioning of a head in a predetermined position of a disk storage medium by an actuator, comprising the steps of:
    computing a position error from a target position of said head and a current position acquired from said head;
    updating estimated state information of a present sample by using said estimated state information of a present sample, an estimated gain of the actuator and estimated gain of disturbance according to an estimated position error between said position error and an estimated position of an observer by disturbance observer control including a model of said actuator and a model of disturbance;
    computing a control value of said actuator from said estimated state information;
    calculating estimated state information of both of said model of said actuator and said model of disturbance in a next sample by using said estimated state information and values of both said model of said actuator and said model of disturbance; and
    estimating disturbance frequency according to said estimated position error and said state information of said disturbance and changing the estimated gain of said actuator, the estimated gain of said disturbance and said values of said model of disturbance corresponding to said disturbance frequency.

2. The head positioning control method according to claim 1, wherein said estimating step comprises:
    a step of estimating said disturbance frequency by adaptive control based on the estimated disturbance component according to said estimated position error; and
    a step of changing the estimated gain of said actuator, the estimated gain of said disturbance and values of said model of disturbance corresponding to said estimated disturbance frequency.

3. The head positioning control method according to claim 1, wherein said computing step comprises:
    a step of computing an estimated position and estimated velocity from an estimated gain of position and an estimated gain of velocity according to said estimated position error; and
    a step of computing an estimated disturbance value from the estimated gain of said disturbance according to said estimated position error.

4. The head positioning control method according to claim 1, wherein said computing step comprises:
    a step of generating state information using an estimated gain of an actuator and an estimated gain of disturbance according to an estimated position error between said position error and the estimated position of said observer by disturbance observer control in which a model of said actuator and a model of disturbance are separated; and
    a step of computing the control value of said actuator from said state information.

5. The head positioning control method according to claim 4, wherein said computing step further comprises:
    a step of generating state information using an estimated gain of the actuator according to an estimated position error between said position error and the estimated position of said observer by observer control of the model of said actuator and computing the control value of said actuator model from said state information;
    a step of generating state information using the estimated gain of said disturbance according to said estimated position error by observer control of the model of said disturbance which is separated from the model of said actuator, and computing a disturbance suppression value from said state information; and a step of computing the control value of said actuator from said control value of said actuator model and said disturbance suppression value.

6. The head positioning control method according to claim 5, wherein said step of computing the disturbance suppression value further comprises a step of generating state information using the estimated gain of said disturbance according to said estimated position error by observer control of a plurality of models of said disturbance of which adaptive disturbance frequencies are different from one another; and a step of computing said disturbance suppression value from said state information.

7. The head positioning control method according to claim 1, wherein said estimating step comprises a step of estimating said disturbance frequency according to said estimated position error, said state information of said disturbance and said estimated gain of said disturbance.

8. A head positioning control method for controlling positioning of a head in a predetermined position of a disk storage medium by an actuator, comprising the steps of:

computing a position error from a target position of said head and a current position acquired from said head;

generating state information using an estimated gain of the actuator and estimated gain of disturbance according to an estimated position error between said position error and an estimated position of an observer by disturbance observer control including a model of said actuator and a model of disturbance;

computing a control value of said actuator from said state information; and estimating disturbance frequency according to said estimated position error and said state information of said disturbance and changing the estimated gain of said actuator, the estimated gain of said disturbance and values of said model of disturbance corresponding to said disturbance frequency;

wherein said estimating step comprises:

a step of estimating said disturbance frequency by adaptive control based on the estimated disturbance component according to said estimated position error;

a step of changing the estimated gain of said actuator, the estimated gain of said disturbance and values of said model of disturbance corresponding to said estimated disturbance frequency; and a step of estimating said disturbance frequency by integrating said estimated disturbance component according to said position error.

9. A head positioning control method for controlling positioning of a head in a predetermined position of a disk storage medium by an actuator, comprising the steps of:

computing a position error from a target position of said head and a current position acquired from said head;

generating state information using an estimated gain of the actuator and estimated gain of disturbance according to an estimated position error between said position error and an estimated position of an observer by disturbance observer control including a model of said actuator and a model of disturbance;

computing a control value of said actuator from said state information; and estimating disturbance frequency according to said estimated position error and said state information of said disturbance and changing the estimated gain of said actuator, the estimated gain of said disturbance and values of said model of disturbance corresponding to said disturbance frequency;

wherein said estimating step comprises:

a step of estimating said disturbance frequency by adaptive control based on the estimated disturbance component according to said estimated position error;

a step of changing the estimated gain of said actuator, the estimated gain of said disturbance and values of said model of disturbance corresponding to said estimated disturbance frequency; and a step of estimating said disturbance frequency by integrating and double-integrating said estimated disturbance component according to said position error.

10. A disk apparatus, comprising:

a head for at least reading data on a disk storage medium;

an actuator for positioning said head in a predetermined position of said disk storage medium; and a control unit for computing a position error from a target position of said head and a current position acquired from said head, updating estimated state information of a present sample by using said estimated state information of a present sample, and an estimated gain of the actuator and estimated gain of disturbance according to an estimated position error between said position error and an estimated position of an observer by disturbance observer control including a model of said actuator and a model of disturbance, computing a control value of said actuator from said estimated state information, and calculating estimated state information of both said model of said actuator and said model of disturbance in a next sample by using said estimated state information and values of both said model of said actuator and said model of disturbance, wherein said control unit estimates a disturbance frequency according to said estimated position error and said state information of said disturbance and changing the estimated gain of said actuator, the estimated gain of said disturbance and said values of said model of disturbance corresponding to said disturbance frequency.

11. The disk apparatus according to claim 10, wherein said control unit estimates said disturbance frequency by adaptive control based on the estimated disturbance component according to said estimated position error, and changes the estimated gain of said actuator, the estimated gain of said disturbance and values of said model of disturbance corresponding to said estimated disturbance frequency.

12. The disk apparatus according to claim 10, wherein said control unit computes an estimated position and estimated velocity from an estimated gain of position and an estimated gain of velocity according to said estimated position error, and computes an estimated disturbance value from the estimated gain of said disturbance according to said estimated position error.

13. The disk apparatus according to claim 10, wherein said control unit generates state information using an estimated gain of an actuator and an estimated gain of disturbance according to an estimated error between said position error and the estimated position of said observer by disturbance observer control in which a model of said actuator and a model of disturbance are separated, and computes the control value of said actuator from said state information.

14. The disk apparatus according to claim 13, wherein said control unit generates state information using an estimated gain of the actuator according to an estimated position error between said position error and the estimated position of said observer by observer control of the model of said actuator, computes the control value of said actuator model from said state information, generates state information using the estimated gain of said disturbance according to said estimated position error by observer control of the model of said disturbance which is separated from the model of said actuator, computes a disturbance suppression value from said state information, and computes the control value of said actuator from said control value of said actuator model and said disturbance suppression value.

15. The disk apparatus according to claim 14, wherein said control unit generates state information using the estimated gain of said disturbance according to said estimated position error by observer control of a plurality of models of said disturbance of which adaptive disturbance frequencies are different from one another, and computes said disturbance suppression value from said state information.

16. The disk apparatus according to claim 10, wherein said control unit estimates said disturbance frequency according to said estimated position error, said state information of said disturbance and said estimated gain of said disturbance.

17. A disk apparatus, comprising:
a head for at least reading data on a disk storage medium;
an actuator for positioning said head in a predetermined position of said disk storage medium; and
a control unit for computing a position error from a target position of said head and a current position acquired from said head, generating state information using an estimated gain of the actuator and estimated gain of the disturbance according to an estimated position error between said position error and an estimated position of an observer by disturbance observer control including a model of said actuator and a model of disturbance, and computing a control value of said actuator from said state information,
wherein said control unit estimates a disturbance frequency according to said estimated position error and said state information of said disturbance and changes the estimated gain of said actuator, the estimated gain of said disturbance and values of said model of disturbance corresponding to said disturbance frequency,
wherein said control unit estimates said disturbance frequency by adaptive control based on the estimated disturbance component according to said estimated position error, and changes the estimated gain of said actuator and the estimated gain of said disturbance corresponding to said estimated disturbance frequency, and
wherein said control unit estimates said disturbance frequency by integrating said estimated disturbance component according to said position error.

18. A disk apparatus, comprising:
a head for at least reading data on a disk storage medium;
an actuator for positioning said head in a predetermined position of said disk storage medium; and
a control unit for computing a position error from a target position of said head and a current position acquired from said head, generating state information using an estimated gain of the actuator and estimated gain of the disturbance according to an estimated position error between said position error and an estimated position of an observer by disturbance observer control including a model of said actuator and a model of disturbance, and computing a control value of said actuator from said state information,
wherein said control unit estimates a disturbance frequency according to said estimated position error and said state information of said disturbance and changes the estimated gain of said actuator, the estimated gain of said disturbance and values of said model of disturbance corresponding to said disturbance frequency,
wherein said control unit estimates said disturbance frequency by adaptive control based on the estimated disturbance component according to said estimated position error, and changes the estimated gain of said actuator and the estimated gain of said disturbance corresponding to said estimated disturbance frequency, and
wherein said control unit estimates said disturbance frequency by integrating and double-integrating said estimated disturbance component according to said position error.

19. A head positioning control device for positioning a head for at least reading data of a disk storage medium in a predetermined position of said disk storage medium by controlling an actuator, comprising:
a processing unit for computing a position error from a target position of said head and a current position acquired from said head, updating estimated state information of a present sample by using said estimated state information of a present sample, and estimated gain of the actuator and estimated gain of disturbance according to an estimated position error between said position error and an estimate position of an observer by disturbance observer control including a model of said actuator and a model of disturbance, and computing a control value of said actuator from said estimated state information, and calculating estimated state information of both said model of said actuator and said model of disturbance in a next sample by using said estimated state information and values of both said model of said actuator and said model of disturbance; and
a disturbance estimation unit for estimating disturbance frequency according to said estimated position error and said state information of said disturbance and changing the estimated gain of said actuator, the estimated gain of said disturbance and said values of said model of disturbance corresponding to said disturbance frequency.

20. The head positioning control device according to claim 19, wherein said disturbance estimation unit estimates said disturbance frequency by adaptive control based on the estimated disturbance component according to said estimated position error, and changes the estimated gain of said actuator, the estimated gain of said disturbance and values of said model of disturbance corresponding to said estimated disturbance frequency.

21. The head positioning control device according to claim 19, wherein said processing unit computes an estimated position and estimated velocity from an estimated gain of position and an estimated gain of velocity according to said estimated position error, and computes an estimated disturbance value from the estimated gain of said disturbance according to said estimated position error.

22. The head positioning control device according to claim 19, wherein said processing unit generates state information using an estimated gain of an actuator and an estimated gain of disturbance according to an estimated position error between said position error and the estimated position of said observer by disturbance observer control in which a model of said actuator and a model of disturbance are separated, and computes the control value of said actuator from said state information.

23. The head positioning control device according to claim 19, wherein said disturbance estimation unit estimates said disturbance frequency according to said estimated position error, said state information of said disturbance and said estimated gain of said disturbance.

* * * * *